US012803059B2

(12) United States Patent
Otani

(10) Patent No.: US 12,803,059 B2
(45) Date of Patent: Nov. 17, 2026

(54) SECONDARY BATTERY, ELECTRONIC EQUIPMENT, AND ELECTRIC TOOL

(71) Applicant: MURATA MANUFACTURING CO., LTD., Kyoto (JP)

(72) Inventor: Akira Otani, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 694 days.

(21) Appl. No.: 18/215,574

(22) Filed: Jun. 28, 2023

(65) Prior Publication Data

US 2023/0335805 A1 Oct. 19, 2023

Related U.S. Application Data

(63) Continuation of application No. PCT/JP2022/002036, filed on Jan. 20, 2022.

(30) Foreign Application Priority Data

Feb. 2, 2021 (JP) ................................ 2021-014743

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0525* (2013.01); *H01M 50/107* (2021.01);
(Continued)

(58) Field of Classification Search
CPC .... H01M 4/04; H01M 50/107; H01M 50/121; H01M 50/124
See application file for complete search history.

(56) References Cited

U.S. PATENT DOCUMENTS

| | | | | |
|---|---|---|---|---|
| 2007/0042270 A1* | 2/2007 | Ohata | H01M 50/446 | 429/251 |
| 2012/0088137 A1* | 4/2012 | Nakura | H01M 10/052 | 429/211 |
| 2017/0098813 A1* | 4/2017 | Yoo | H01M 50/119 | |

FOREIGN PATENT DOCUMENTS

| | | | |
|---|---|---|---|
| CN | 1788371 | A | 6/2006 |
| CN | 102473956 | A | 5/2012 |

(Continued)

OTHER PUBLICATIONS

Machine Translation of: JP 2006-032112 A, Arai, Feb. 2, 2006.*
(Continued)

*Primary Examiner* — Kenneth J Douyette
(74) *Attorney, Agent, or Firm* — K&L Gates LLP

(57) ABSTRACT

A secondary battery suppresses an occurrence of a welding defect as much as possible. A negative electrode includes, at a first major surface of a negative electrode foil having a band shape, a first negative electrode active material covered part covered with a negative electrode active material layer, a first negative electrode active material uncovered part extending in a longitudinal direction of the negative electrode foil, and a first insulating layer provided between the first negative electrode active material covered part and the first negative electrode active material uncovered part. The negative electrode further includes, at a second major surface which is another major surface of the negative electrode foil, a second negative electrode active material covered part covered with a negative electrode active material layer, a second negative electrode active material uncovered part extending in the longitudinal direction of the negative electrode foil, and a second insulating layer provided between the second negative electrode active material covered part and the second negative electrode active material uncovered part. When at least a negative electrode side of an electrode
(Continued)

wound body is viewed in a section taken along a plane including a central axis, the first major surface faces toward the central axis of the electrode wound body, and furthermore, the first insulating layer is smaller in length than the second insulating layer.

7 Claims, 20 Drawing Sheets

(51) Int. Cl.
*H01M 50/107* (2021.01)
*H01M 50/121* (2021.01)
*H01M 50/124* (2021.01)

(52) U.S. Cl.
CPC ....... *H01M 50/121* (2021.01); *H01M 50/124* (2021.01); *H01M 2220/20* (2013.01); *H01M 2220/30* (2013.01)

(56) References Cited

FOREIGN PATENT DOCUMENTS

| | | | |
|---|---|---|---|
| CN | 106560939 | A | 4/2017 |
| JP | 2006032112 | A | 2/2006 |
| JP | 2010010117 | A | 1/2010 |
| JP | 2012142206 | A | 7/2012 |
| JP | 2017143003 | A | 8/2017 |

OTHER PUBLICATIONS

Machine Translation of: JP 2010-010117 A, Ono et al., Jan. 14, 2010.*
International Search Report of corresponding PCT application PCT/JP2022/002036, dated Mar. 8, 2022.
Office Action issued for corresponding Chinese Patent Application No. 202280008345.4, dated Jun. 18, 2026. (5 pages.).
Search Report issued for corresponding Chinese Patent Application No. 202280008345.4, dated Jun. 17, 2026. (2 pages.).

* cited by examiner

A

B

SECONDARY BATTERY, ELECTRONIC EQUIPMENT, AND ELECTRIC TOOL

CROSS REFERENCE TO RELATED APPLICATIONS

The present application is a continuation of PCT patent application no. PCT/JP2022/002036, filed on Jan. 20, 2022, which claims priority to Japanese patent application no. 2021-014743, filed on Feb. 2, 2021, the entire contents of which are herein incorporated by reference.

BACKGROUND

The present application relates to a secondary battery, electronic equipment, and an electric tool.

Development of lithium ion batteries has expanded to applications that require high output power, including electric tools and vehicles. One of methods to achieve high output power is high-rate discharging in which a relatively large current is fed from a battery. Because the high-rate discharging involves feeding of a large current, it is desirable to reduce an internal resistance of the battery.

For example, a cylindrical battery is described in which a collector body exposure part on a positive electrode side is welded to a positive electrode collector plate and a collector body exposure part on a negative electrode side is welded to a negative electrode collector plate. In the battery, a resin coating is provided on a base part of the collector body exposure part on each of the positive electrode side and the negative electrode side.

SUMMARY

The present application relates to a secondary battery, electronic equipment, and an electric tool.

A battery described has a structure in which a collector body exposure part is bent to be welded, which can result in unstable welding because the collector body exposure part has no stacked structure. Further, buckling can occur upon bending the collector body exposure part, which makes it difficult to ensure flatness of a weld.

The present application relates to providing, in an embodiment, a secondary battery that stabilizes a position of bending (hereinafter referred to as a bending point as appropriate) of an active material uncovered part (a collector body exposure part) on a negative electrode side to thereby suppress development of a gap at a location where portions of the collector body exposure part overlap with each other, and thus achieves improved flatness of a weld, and to providing electronic equipment and an electric tool that each include the secondary battery.

The present application provides, in an embodiment, a secondary battery including an electrode wound body, a positive electrode current collector plate, a negative electrode current collector plate, and a battery can. The electrode wound body has a structure in which a positive electrode having a band shape and a negative electrode having a band shape are stacked with a separator interposed therebetween and are wound around a central axis. The battery can contains the electrode wound body, the positive electrode current collector plate, and the negative electrode current collector plate.

The positive electrode includes, on a positive electrode foil having a band shape, a positive electrode active material covered part covered with a positive electrode active material layer, and a positive electrode active material uncovered part.

The positive electrode active material uncovered part is coupled to the positive electrode current collector plate at one of end parts of the electrode wound body.

The negative electrode includes, at a first major surface of a negative electrode foil having a band shape, a first negative electrode active material covered part covered with a negative electrode active material layer, a first negative electrode active material uncovered part extending in a longitudinal direction of the negative electrode foil, and a first insulating layer provided between the first negative electrode active material covered part and the first negative electrode active material uncovered part.

The negative electrode further includes, at a second major surface which is another major surface of the negative electrode foil, a second negative electrode active material covered part covered with a negative electrode active material layer, a second negative electrode active material uncovered part extending in the longitudinal direction of the negative electrode foil, and a second insulating layer provided between the second negative electrode active material covered part and the second negative electrode active material uncovered part.

The electrode wound body has a flat surface, in which a negative electrode active material uncovered part including the first negative electrode active material uncovered part and the second negative electrode active material uncovered part is bent toward a central axis of the electrode wound body to form the flat surface, and a groove provided in an end face on a negative electrode side.

The negative electrode current collector plate is coupled to the flat surface.

When at least the negative electrode side of the electrode wound body is viewed in a section taken along a plane including the central axis, the first major surface faces toward the central axis of the electrode wound body, and furthermore, a length of the first insulating layer is smaller than a length of the second insulating layer.

In an embodiment, the present technology makes it possible to stabilize the bending point to thereby suppress development of a gap at the location where the portions of the active material uncovered part overlap with each other, and to thereby achieve improved flatness of the weld. It should be understood that the contents of the present application are not to be construed as being limited by the effects exemplified herein.

DETAILED DESCRIPTION

One or more embodiments of the present application are described below in further detail including with reference to the drawings and examples. It is to be noted that in order to facilitate understanding of description, some features or components in any of the drawings may be enlarged or reduced, or illustration of some portions may be simplified.

Figure 1:
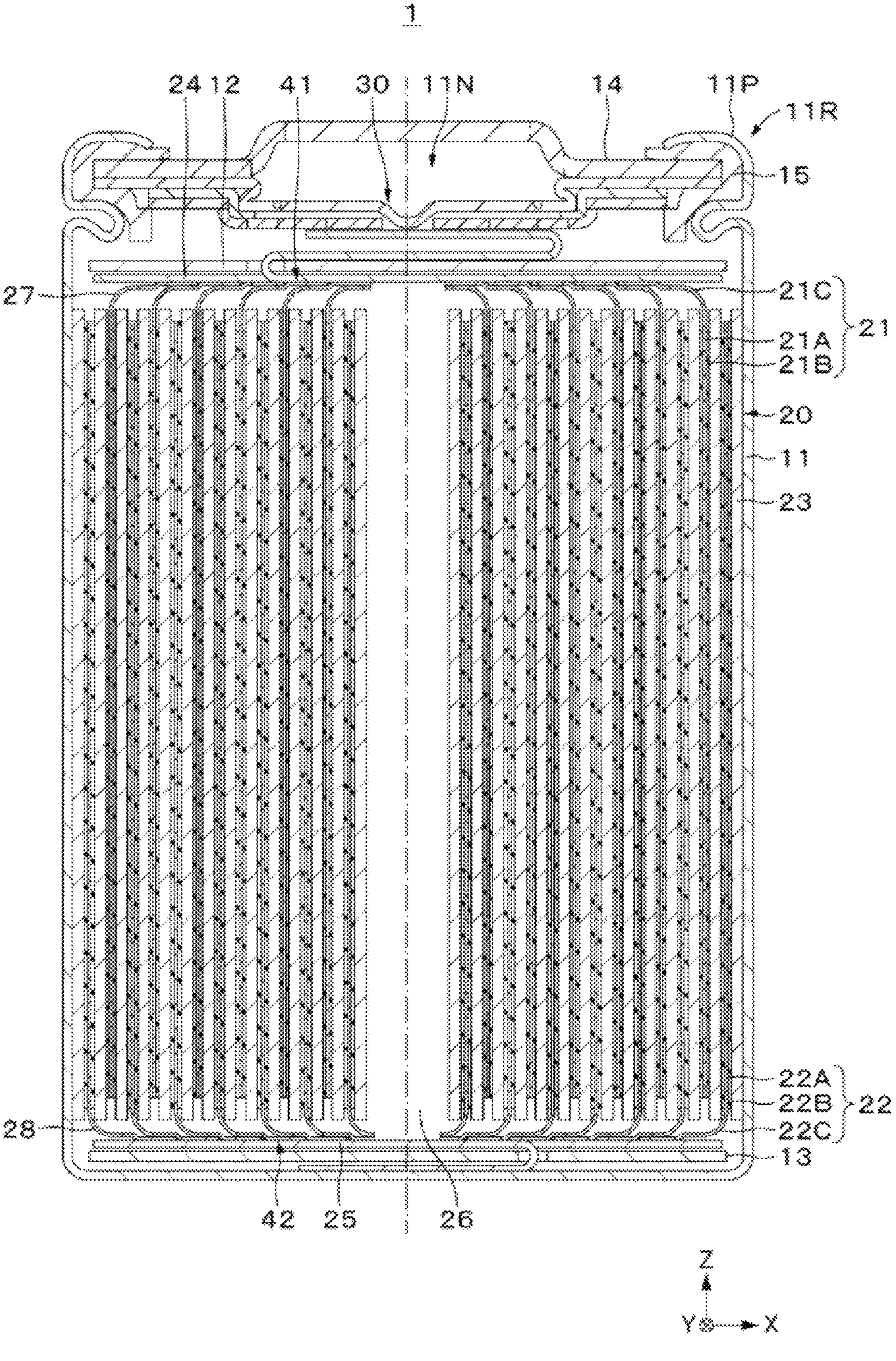
FIG. 1 is a sectional view of a lithium ion battery according to an embodiment.

In an embodiment, a lithium ion battery having a cylindrical shape will be described as an example of a secondary battery. A configuration example of the lithium ion battery according to the present embodiment, i.e., a lithium ion battery 1, will be described with reference to FIGS. 1 to 9. FIG. 1 is a schematic sectional view of the lithium ion battery 1. As illustrated in FIG. 1, the lithium ion battery 1 has a cylindrical shape and includes an electrode wound body 20 contained inside a battery can 11, for example.

In a schematic configuration, the lithium ion battery 1 includes the battery can 11 having a cylindrical shape, and also includes, inside the battery can 11, a pair of insulators 12 and 13 and the electrode wound body 20. Note that the lithium ion battery 1 may further include, for example, one or more of devices and members including, without limitation, a thermosensitive resistive device or a PTC device and a reinforcing member, inside the battery can 11.

The battery can 11 is a member that contains mainly the electrode wound body 20. The battery can 11 is, for example, a cylindrical container with one end face open and another end face closed. That is, the battery can 11 has one open end face (an open end face 11N). The battery can 11 includes, for example, one or more of metal materials including, without limitation, iron, aluminum, and alloys thereof. The battery can 11 may have a surface plated with one or more of metal materials including, without limitation, nickel, for example.

The insulators 12 and 13 are disk-shaped plates each having a surface that is substantially perpendicular to a central axis of the electrode wound body 20. The central axis passes through substantially a center of each of end faces of the electrode wound body 20 and is in a direction parallel to a Z-axis in FIG. 1. The insulators 12 and 13 are so disposed as to allow the electrode wound body 20 to be interposed therebetween, for example.

A battery cover 14 and a safety valve mechanism 30 are crimped to the open end face 11N of the battery can 11 via a gasket 15 to thereby provide a crimped structure 11R (a crimp structure). The battery can 11 is thus sealed, with the electrode wound body 20 and other components being contained inside the battery can 11.

The battery cover 14 is a member that closes the open end face 11N of the battery can 11 mainly in the state where the electrode wound body 20 and the other components are contained inside the battery can 11. The battery cover 14 includes, for example, a material similar to the material included in the battery can 11. A middle region of the battery cover 14 protrudes in a +Z direction, for example. A region other than the middle region, that is, a peripheral region, of the battery cover 14 is thus in contact with the safety valve mechanism 30, for example.

The gasket 15 is a member that is mainly interposed between the battery can 11 (a bent part 11P) and the battery cover 14 to thereby seal a gap between the bent part 11P and the battery cover 14. Note that the gasket 15 may have a surface coated with a material such as asphalt, for example.

The gasket 15 includes one or more of insulating materials, for example. The insulating material is not particularly limited in kind. For example, a polymer material such as polybutylene terephthalate (PBT) or polypropylene (PP) may be used as the insulating material. In particular, the insulating material is preferably polybutylene terephthalate. A reason for this is that such a material is able to sufficiently seal the gap between the bent part 11P and the battery cover 14 while electrically separating the battery can 11 and the battery cover 14 from each other.

The safety valve mechanism 30 cancels the sealed state of the battery can 11 and thereby releases a pressure inside the battery can 11, i.e., an internal pressure of the battery can 11 on an as-needed basis, mainly upon an increase in the internal pressure. Examples of a cause of the increase in the internal pressure of the battery can 11 include a gas generated due to a decomposition reaction of an electrolytic solution during charging and discharging.

In the lithium ion battery 1 having a cylindrical shape, the electrode wound body 20 is contained in the battery can 11, being impregnated with the electrolytic solution. The electrode wound body 20 includes a positive electrode 21 having a band shape and a negative electrode 22 having a band shape. The positive electrode 21 and the negative electrode 22 are stacked with a separator 23 interposed therebetween, and are wound around the central axis in a spiral shape. The positive electrode 21 includes a positive electrode foil 21A with a positive electrode active material layer 21B provided on one of or each of both surfaces of the positive electrode foil 21A. A material of the positive electrode foil 21A is a metal foil including, for example, aluminum or an aluminum alloy. The negative electrode 22 includes a negative electrode foil 22A with a negative electrode active material layer provided on one of or each of both surfaces of the negative electrode foil 22A. A material of the negative electrode foil 22A is a metal foil including, for example, nickel, a nickel alloy, copper, or a copper alloy. The separator 23 is a porous insulating film. The separator 23 electrically insulates the positive electrode 21 and the negative electrode 22 from each other, and allows for movement of substances including, without limitation, ions and the electrolytic solution.

Figure 2:
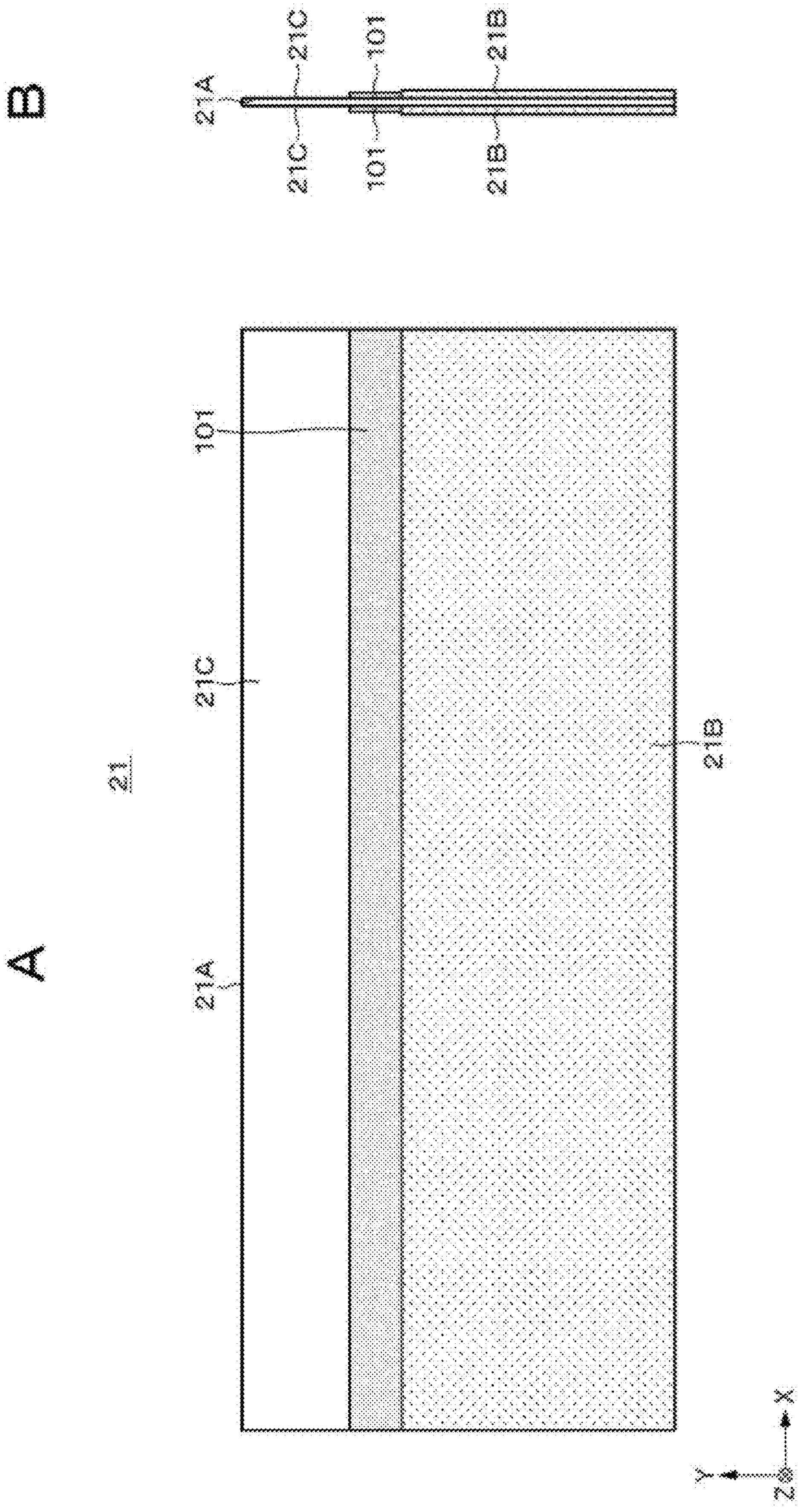
FIG. 2 includes views A and B which are diagrams for describing a positive electrode according to an embodiment.

FIG. 2, view A is a front view of the positive electrode 21 before being wound. FIG. 2, view B is a side view of the positive electrode 21 of FIG. 2, view A. Note that in describing FIG. 2, view A and FIGS. 3, 4, and 6, a horizontal direction (which may also be referred to as a longitudinal direction) in the plane of the drawing sheet may be referred to as an X-axis direction; a vertical direction (which may also be referred to as a width direction) in the plane of the drawing sheet may be referred to as a Y-axis direction; and a direction into the plane of the drawing sheet may be referred to as a Z-axis direction.

The positive electrode 21 includes, at each of one major surface and another major surface of the positive electrode foil 21A, a part (a part shaded with dots) covered with the positive electrode active material layer 21B, and a positive electrode active material uncovered part 21C which is a part not covered with the positive electrode active material layer 21B. Note that in the following description, the part covered with the positive electrode active material layer 21B will be referred to as a positive electrode active material covered part 21B as appropriate. In the present embodiment, the two major surfaces of the positive electrode foil 21A have similar configurations; however, a configuration may be employed in which one of the major surfaces of the positive electrode foil 21A is provided with the positive electrode active material covered part 21B. Further, an insulating layer 101 (a gray region in FIGS. 2A and 2B) is provided between the positive electrode active material covered part 21B and the positive electrode active material uncovered part 21C.

Figure 3:
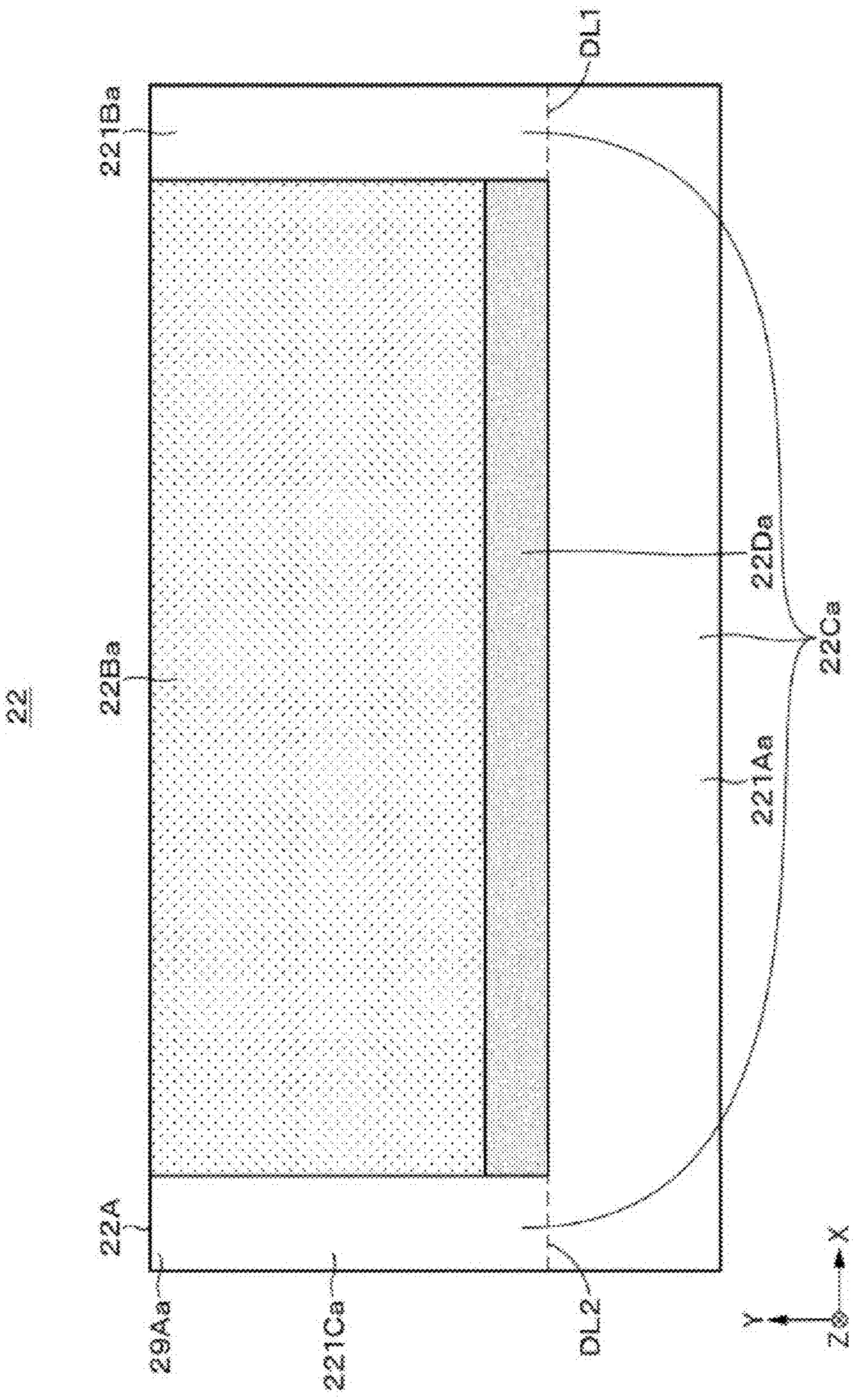
FIG. 3 is a diagram for describing a configuration of a negative electrode (before being wound) according to an embodiment, as viewed on one major surface side thereof.

The negative electrode foil 22A of the negative electrode 22 has one major surface 29Aa and another major surface 29Ab. The major surface 29Aa is an example of a first major surface. The major surface 29Ab is an example of a second major surface. In the electrode wound body 20, the major surface 29Aa is a surface facing toward the central axis of the electrode wound body 20, and the other major surface 29Ab is a surface facing toward a peripheral surface of the electrode wound body 20. FIG. 3 is a front view of the one major surface 29Aa of the negative electrode 22 before being wound. The negative electrode 22 includes, at the major surface 29Aa of the negative electrode foil 22A, a part (a part shaded with dots) covered with the negative electrode active material layer, and a negative electrode active material uncovered part 22Ca which is a part not covered with the negative electrode active material layer. Note that in the following description, the part covered with the negative electrode active material layer will be referred to as a negative electrode active material covered part as appropriate. Specifically, the negative electrode active material covered part provided at the major surface 29Aa will be referred to as a negative electrode active material covered part 22Ba as appropriate, and the negative electrode active material covered part provided at the major surface 29Ab will be referred to as a negative electrode active material covered part 22Bb as appropriate. The negative electrode active material covered part 22Ba is an example of a first negative electrode active material covered part. The negative electrode active material covered part 22Bb is an example of a second negative electrode active material covered part.

As illustrated in FIG. 3, the negative electrode active material uncovered part 22Ca includes, for example, a negative electrode active material uncovered part 221Aa, a negative electrode active material uncovered part 221Ba, and a negative electrode active material uncovered part 221Ca. The negative electrode active material uncovered part 221Aa is an example of a first negative electrode active material uncovered part, and extends in the longitudinal direction of the negative electrode 22, i.e., in the X-axis direction. The negative electrode active material uncovered part 221Ba is provided on a beginning side of winding of the negative electrode 22 and extends in the width direction of the negative electrode 22, i.e., in the Y-axis direction. The negative electrode active material uncovered part 221Ca is provided on an end side of the winding of the negative electrode 22 and extends in the width direction of the negative electrode 22, i.e., in the Y-axis direction. Note that in FIG. 3, a boundary between the negative electrode active material uncovered part 221Aa and the negative electrode active material uncovered part 221Ba is represented by a dashed line DL1, and a boundary between the negative electrode active material uncovered part 221Aa and the negative electrode active material uncovered part 221Ca is represented by a dashed line DL2.

The negative electrode 22 further includes a first insulating layer 22Da on the major surface 29Aa. The first insulating layer 22Da is provided between the negative electrode active material covered part 22Ba and the negative electrode active material uncovered part 221Aa. More specifically, the first insulating layer 22Da is provided along a boundary between the negative electrode active material uncovered part 221Aa and the negative electrode active material covered part 22Ba, the boundary extending in the longitudinal direction of the negative electrode 22, i.e., in the X-axis direction. The first insulating layer 22Da provided on the major surface 29Aa faces toward the central axis of the electrode wound body 20 when at least a negative electrode side of the electrode wound body 20 is viewed in a section taken along a plane including the central axis. Further, the first insulating layer 22Da has a thickness smaller than or equal to a thickness of the negative electrode active material covered part 22Ba. Note that a positive electrode side of the electrode wound body 20 refers to a region including an end face 41, i.e., one of two opposite end faces of the electrode wound body 20 having a substantially cylindrical shape. The negative electrode side of the electrode wound body 20 refers to a region including an end face 42, i.e., another of the two opposite end faces of the electrode wound body 20 having the substantially cylindrical shape.

Figure 4:
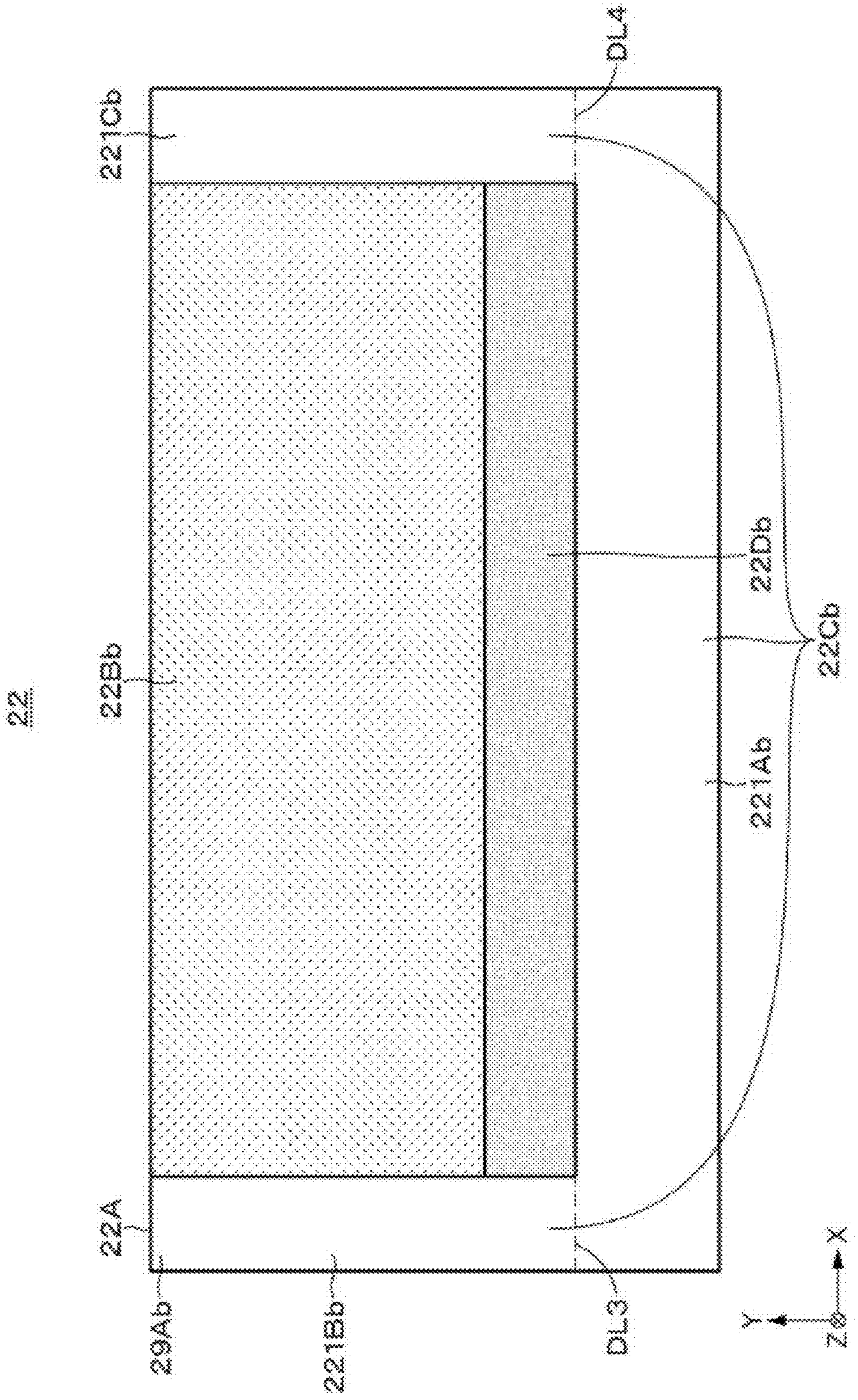
FIG. 4 is a diagram for describing a configuration of the negative electrode (before being wound) according to an embodiment, as viewed on another major surface side thereof.

FIG. 4 is a front view of the major surface 29Ab of the negative electrode foil 22A. As with the major surface 29Aa, the major surface 29Ab of the negative electrode foil 22A is provided with the negative electrode active material covered part 22Bb. The major surface 29Ab is further provided with a negative electrode active material uncovered part 22Cb which is not covered with the negative electrode active material layer.

As illustrated in FIG. 4, the negative electrode active material uncovered part 22Cb includes, for example, a negative electrode active material uncovered part 221Ab, a negative electrode active material uncovered part 221Bb, and a negative electrode active material uncovered part 221Cb. The negative electrode active material uncovered part 221Ab is an example of a second negative electrode active material uncovered part, and extends in the longitudinal direction of the negative electrode 22, i.e., in the X-axis direction. The negative electrode active material uncovered part 221Bb is provided on the beginning side of the winding of the negative electrode 22 and extends in the width direction of the negative electrode 22, i.e., in the Y-axis direction. The negative electrode active material uncovered part 221Cb is provided on the end side of the winding of the negative electrode 22 and extends in the width direction of the negative electrode 22, i.e., in the Y-axis direction. Note that in FIG. 4, a boundary between the negative electrode active material uncovered part 221Ab and the negative electrode active material uncovered part 221Bb is represented by a dashed line DL3, and a boundary between the negative electrode active material uncovered part 221Ab and the negative electrode active material uncovered part 221Cb is represented by a dashed line DL4.

The negative electrode 22 further includes a second insulating layer 22Db on the major surface 29Ab. The second insulating layer 22Db is provided between the negative electrode active material covered part 22Bb and the negative electrode active material uncovered part 221Ab. More specifically, the second insulating layer 22Db is provided along a boundary between the negative electrode active material uncovered part 221Ab and the negative electrode active material covered part 22Bb, the boundary extending in the longitudinal direction of the negative electrode 22, i.e., in the X-axis direction. The second insulating layer 22Db provided on the major surface 29Ab faces toward the peripheral surface of the electrode wound body 20 when at least the negative electrode side of the electrode wound body 20 is viewed in a section taken along a plane including the central axis. The second insulating layer 22Db has a thickness smaller than or equal to a thickness of the negative electrode active material covered part 22Bb.

Figure 5:
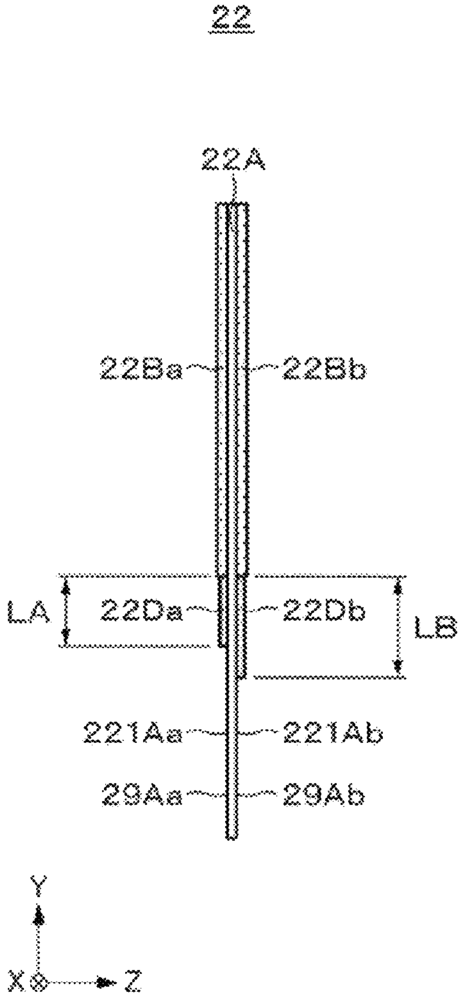
FIG. 5 is a side view of the negative electrode (before being wound) according to an embodiment.

FIG. 5 is a side view of the negative electrode 22. A left side of the negative electrode 22 corresponds to a surface facing toward the central axis of the electrode wound body 20, and a right side of the negative electrode 22 corresponds to a surface facing toward the peripheral surface of the electrode wound body 20. As illustrated in FIG. 5, the first insulating layer 22Da has a length LA smaller than a length LB of the second insulating layer 22Db. The length LA of the first insulating layer 22Da and the length LB of the second insulating layer 22Db may each also be said to be a length in the width direction of the negative electrode 22 having a band shape, and may each also be said to be a length in a direction along the central axis of the electrode wound body 20.

The first insulating layer 22Da and the second insulating layer 22Db each include, for example, a resin such as polyvinylidene difluoride (PVDF). In the following, the first insulating layer 22Da and the second insulating layer 22Db will be collectively referred to as the first insulating layer 22Da or the like as appropriate, unless it is necessary to distinguish the two from each other. The first insulating layer 22Da or the like may further include inorganic particles or organic particles. Examples of the inorganic particles include particles of one or more of materials including, without limitation, aluminum oxide, aluminum nitride, aluminum hydroxide, magnesium hydroxide, boehmite, talc, silica, and mica.

Furthermore, the first insulating layer 22Da or the like may include a metal or metal compound having an X-ray shielding effect higher than a predetermined X-ray shielding effect. Specifically, the first insulating layer 22Da or the like may include a metal having an X-ray shielding effect higher than that of the metal included in the negative electrode foil 22A (the metal mainly included in the negative electrode foil 22A), or a metal compound including a metal having an X-ray shielding effect higher than that of the metal included in the negative electrode foil 22A (the metal mainly included in the negative electrode foil 22A). More specifically, the first insulating layer 22Da or the like may include particles of the above-described metal, or particles of the above-described metal compound.

The metal having an X-ray shielding effect higher than that of the metal (e.g., copper) included in the negative electrode foil 22A includes one or more selected from the group consisting of tungsten (W), iridium (Ir), platinum (Pt), and gold (Au), for example. The metal compound including a metal having an X-ray shielding effect higher than that of the metal included in the negative electrode foil 22A includes one or more selected from the group consisting of a metal oxide, a metal sulfate compound, and a metal carbonate compound. The metal oxide includes one or more selected from the group consisting of yttrium oxide, hafnium oxide, tantalum pentoxide, and tungsten oxide, for example. The metal sulfate compound includes one or more selected from the group consisting of barium sulfate and strontium sulfate. The metal carbonate compound includes strontium carbonate.

In the electrode wound body 20 of the lithium ion battery 1 having the cylindrical shape according to the present embodiment, the positive electrode 21 and the negative electrode 22 are laid over each other and wound, with the separator 23 interposed therebetween, in such a manner that the positive electrode active material uncovered part 21C and each of the negative electrode active material uncovered parts 221Aa and 221Ab face toward opposite directions.

The electrode wound body 20 has a through hole 26 at a center thereof. Specifically, the through hole 26 is a hole part that develops at substantially a center of a stack in which the positive electrode 21, the negative electrode 22, and the separator 23 are stacked. The through hole 26 is used as a hole into which a rod-shaped welding tool, which will hereinafter be referred to as a welding rod, as appropriate, is to be inserted in a process of assembling the lithium ion battery 1.

Figure 6:
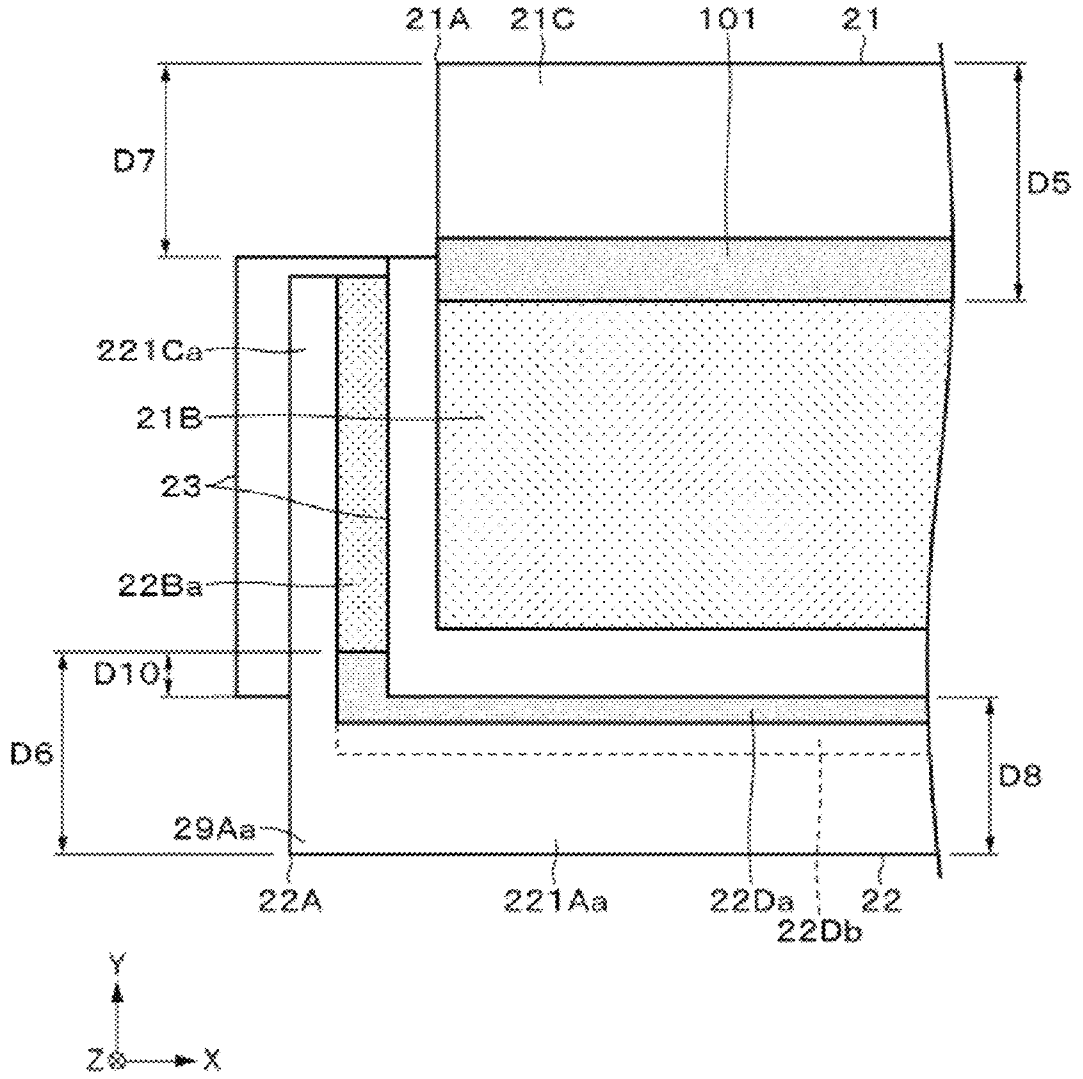
FIG. 6 is a diagram illustrating the positive electrode, the negative electrode, and a separator before being wound.

Details of the electrode wound body 20 will be described. FIG. 6 illustrates an example of a pre-winding structure in which the positive electrode 21, the negative electrode 22, and the separator 23 are stacked. The positive electrode 21 according to the present embodiment further includes the insulating layer 101 (a gray region part on an upper side in FIG. 6) covering a boundary between the positive electrode active material covered part 21B (a part lightly shaded with dots in FIG. 6) and the positive electrode active material uncovered part 21C. The insulating layer 101 has a length in the width direction of about 3 mm, for example. All of a region of the positive electrode active material uncovered part 21C opposed to the negative electrode active material covered part 22Ba with the separator 23 interposed therebetween is covered with the insulating layer 101. The insulating layer 101 has an effect of reliably preventing an internal short circuit of the lithium ion battery 1 when foreign matter enters between the negative electrode active material covered part 22Ba and the positive electrode active material uncovered part 21C. In addition, the insulating layer 101 has an effect of, in a case where the lithium ion battery 1 undergoes an impact, absorbing the impact and thereby reliably preventing the positive electrode active material uncovered part 21C from bending and short-circuiting with the negative electrode 22.

Here, as illustrated in FIG. 6, a length of the positive electrode active material uncovered part 21C in the width direction is denoted as D5, and a length from an end of the negative electrode active material covered part 22Ba to an end of the negative electrode foil 22A is denoted as D6. In an embodiment, it is preferable that D5>D6. For example, D5=7 (mm), and D6=4 (mm). Where a length of a portion of the positive electrode active material uncovered part 21C protruding from one end in the width direction of the separator 23 is denoted as D7 and a length of a portion of each of the first insulating layer 22Da and the negative electrode active material uncovered part 221Aa (or a portion of each of the second insulating layer 22Db and the negative electrode active material uncovered part 221Ab) protruding from another end in the width direction of the separator 23 is denoted as D8, in an embodiment, it is preferable that D7>D8. For example, D7=4.5 (mm), and D8=3 (mm).

The positive electrode foil 21A and the positive electrode active material uncovered part 21C include aluminum, for example. The negative electrode foil 22A, the negative electrode active material uncovered part 221Aa, and the negative electrode active material uncovered part 221Ab include copper, for example. Thus, the positive electrode active material uncovered part 21C is typically softer, that is, lower in Young's modulus, than the negative electrode active material uncovered part 22Ca and the negative electrode active material uncovered part 22Cb. Accordingly, in an embodiment, it is more preferable that D5>D6 and D7>D8. In such a case, when portions of the positive electrode active material uncovered part 21C and portions of the negative electrode active material uncovered part (in this example, portions of the negative electrode active material uncovered part 221Aa and portions of the negative electrode active material uncovered part 221Ab) are simultaneously bent with equal pressures from both electrode sides, respective heights of the bent portions as measured from respective ends of the separator 23 may be substantially the same between the positive electrode 21 and the negative electrode 22. In this situation, the portions of the positive electrode active material uncovered part 21C appropriately overlap with each other when bent, which makes it possible to easily couple the positive electrode active material uncovered part 21C and a positive electrode current collector plate 24 to each other by laser welding in a process of fabricating the lithium ion battery 1. Further, the portions of each of the negative electrode active material uncovered parts 221Aa and 221Ab appropriately overlap with each other when bent, which makes it possible to easily couple the bent portions and a negative electrode current collector plate 25 to each other by laser welding in the process of fabricating the lithium ion battery 1. Details of the process of fabricating the lithium ion battery 1 will be described later.

In a typical lithium ion battery, for example, a lead for current extraction is welded at one location on each of the positive electrode and the negative electrode. However, such a configuration is not suitable for high-rate discharging because a high internal resistance of the battery results to cause the lithium ion battery to generate heat and become hot during discharging. To address this, in the lithium ion battery 1 according to the present embodiment, the positive electrode current collector plate 24 is disposed on the one end face 41 of the electrode wound body 20, and the negative electrode current collector plate 25 is disposed on the other end face 42 of the electrode wound body 20. In addition, the positive electrode current collector plate 24 and the positive electrode active material uncovered part 21C located at the end face 41 are welded to each other at multiple points; and the negative electrode current collector plate 25 and each of the negative electrode active material uncovered parts 221Aa and 221Ab located at the end face 42 are welded to each other at multiple points. The internal resistance of the lithium ion battery 1 is thereby kept low to allow for high-rate discharging.

Figure 7:
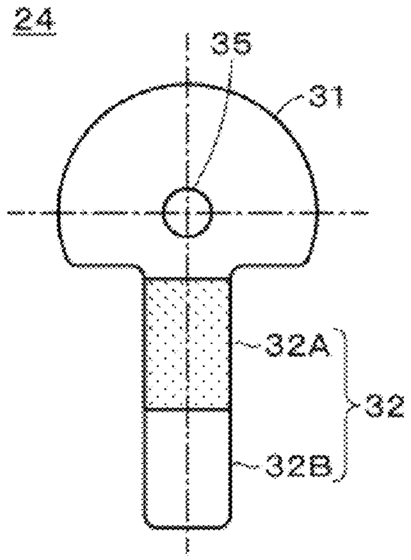
FIG. 7 includes views A and B, where view A is a plan view of a positive electrode current collector plate according to an embodiment, and view B is a plan view of a negative electrode current collector plate according to an embodiment.
Figure 7:
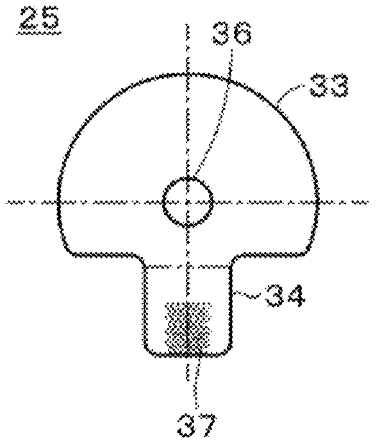

FIG. 7, views A and B illustrate respective examples of the current collector plates. FIG. 7, view A illustrates the positive electrode current collector plate 24. FIG. 7, view B illustrates the negative electrode current collector plate 25. The positive electrode current collector plate 24 and the negative electrode current collector plate 25 are contained in the battery can 11 (see FIG. 1). A material of the positive electrode current collector plate 24 is a metal plate including, for example, a simple substance or a composite material of aluminum or an aluminum alloy. A material of the negative electrode current collector plate 25 is a metal plate including, for example, a simple substance or a composite material of nickel, a nickel alloy, copper, or a copper alloy. As illustrated in FIG. 7, view A, the positive electrode current collector plate 24 has a shape in which a band-shaped part 32 having a rectangular shape is attached to a fan-shaped part 31 having a flat fan shape. The fan-shaped part 31 has a hole 35 at a position near a middle thereof. The position of the hole 35 corresponds to a position of the through hole 26.

A part shaded with dots in FIG. 7, view A represents an insulating part 32A in which an insulating tape or an insulating material is attached or applied to the band-shaped part 32. A part below the dot-shaded part in FIG. 7, view A represents a coupling part 32B to be coupled to a sealing plate that also serves as an external terminal. Note that in a case of a battery structure having no metallic center pin (not illustrated) in the through hole 26, the insulating part 32A may be omitted because there is a low possibility of contact of the band-shaped part 32 with a region of a negative electrode potential. In such a case, it is possible to increase charge and discharge capacities by increasing a width of each of the positive electrode 21 and the negative electrode 22 by an amount corresponding to a thickness of the insulating part 32A.

The negative electrode current collector plate 25 is similar to the positive electrode current collector plate 24 in shape, but has a band-shaped part of a different shape. The band-shaped part 34 of the negative electrode current collector plate of FIG. 7, view B is shorter than the band-shaped part 32 of the positive electrode current collector plate and includes no portion corresponding to the insulating part 32A. The band-shaped part 34 is provided with circular projections 37 depicted as multiple circles. Upon resistance welding, current is concentrated on the projections 37, causing the projections 37 to melt to thereby cause the band-shaped part 34 to be welded to a bottom of the battery can 11. As with the positive electrode current collector plate 24, the negative electrode current collector plate 25 has a hole 36 at a position near a middle of a fan-shaped part 33. The position of the hole 36 corresponds to the position of the through hole 26. The fan-shaped part 31 of the positive electrode current collector plate 24 and the fan-shaped part 33 of the negative electrode current collector plate 25, which are each in the shape of a fan, cover respective portions of the end faces 41 and 42. By not covering all of the respective end faces 41 and 42, it is possible to allow the electrolytic solution to smoothly permeate the electrode wound body 20 in assembling the lithium ion battery 1, and it is also possible to facilitate releasing of a gas, which is generated when the lithium ion battery 1 comes into an abnormally hot state or an overcharged state, to the outside of the lithium ion battery 1.

The positive electrode active material layer includes at least a positive electrode material (a positive electrode active material) into which lithium is insertable and from which lithium is extractable, and may further include, for example, a positive electrode binder and a positive electrode conductor. The positive electrode material is preferably a lithium-containing composite oxide or a lithium-containing phosphoric acid compound. The lithium-containing composite oxide has a layered rock-salt crystal structure or a spinel crystal structure, for example. The lithium-containing phosphoric acid compound has an olivine crystal structure, for example.

The positive electrode binder includes a synthetic rubber or a polymer compound. Examples of the synthetic rubber include a styrene-butadiene-based rubber, a fluorine-based rubber, and ethylene propylene diene. Examples of the polymer compound include polyvinylidene difluoride (PVDF) and polyimide.

The positive electrode conductor is a carbon material such as graphite, carbon black, acetylene black, or Ketjen black. Note that the positive electrode conductor may be a metal material or an electrically conductive polymer.

The negative electrode foil 22A configuring the negative electrode 22 is preferably roughened at its surface to achieve improved adherence to the negative electrode active material layer. The negative electrode active material layer includes at least a negative electrode material (a negative electrode active material) into which lithium is insertable and from which lithium is extractable, and may further include, for example, a negative electrode binder and a negative electrode conductor.

The negative electrode material includes a carbon material, for example. The carbon material is graphitizable carbon, non-graphitizable carbon, graphite, low-crystalline carbon, or amorphous carbon. The carbon material has a fibrous shape, a spherical shape, a granular shape, or a flaky shape.

Further, the negative electrode material includes a metal-based material, for example. Examples of the metal-based material include Li (lithium), Si (silicon), Sn (tin), Al (aluminum), Zr (zinc), and Ti (titanium). A metallic element forms a compound, a mixture, or an alloy with another element, and examples thereof include silicon oxide ($SiO_x$ ($0<x\leq 2$)), silicon carbide (SiC), an alloy of carbon and silicon, and lithium titanium oxide (LTO).

The separator 23 is a porous film including a resin, and may be a stacked film including two or more kinds of porous films. Examples of the resin include polypropylene and polyethylene. With the porous film as a base layer, the separator 23 may include a resin layer provided on one of or each of both surfaces of the base layer. A reason for this is that this improves adherence of the separator 23 to each of the positive electrode 21 and the negative electrode 22 and thus suppresses distortion of the electrode wound body 20.

The resin layer includes a resin such as PVDF. In a case of forming the resin layer, a solution including an organic solvent and the resin dissolved therein is applied on the base layer, following which the base layer is dried. Note that the base layer may be immersed in the solution and thereafter the base layer may be dried. From the viewpoint of improving heat resistance and battery safety, the resin layer preferably includes inorganic particles or organic particles. Examples of the kind of the inorganic particles include aluminum oxide, aluminum nitride, aluminum hydroxide, magnesium hydroxide, boehmite, talc, silica, and mica. Alternatively, a surface layer including inorganic particles as a main component and formed by a method such as a sputtering method or an atomic layer deposition (ALD) method may be used instead of the resin layer.

The electrolytic solution includes a solvent and an electrolyte salt, and may further include other materials such as additives on an as-needed basis. The solvent is a nonaqueous solvent such as an organic solvent, or water. The electrolytic solution including a nonaqueous solvent is called a nonaqueous electrolytic solution. Examples of the nonaqueous solvent include a cyclic carbonic acid ester, a chain carbonic acid ester, a lactone, a chain carboxylic acid ester, and a nitrile (mononitrile).

Although a typical example of the electrolyte salt is a lithium salt, the electrolyte salt may include any salt other than the lithium salt. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). These salts may also be used in mixture with each other. From the viewpoint of improving a battery characteristic, it is preferable to use a mixture of $LiPF_6$ and $LiBF_4$, in particular. Although not particularly limited, a content of the electrolyte salt is preferably in a range from 0.3 mol/kg to 3 mol/kg both inclusive with respect to the solvent.

Figure 8:
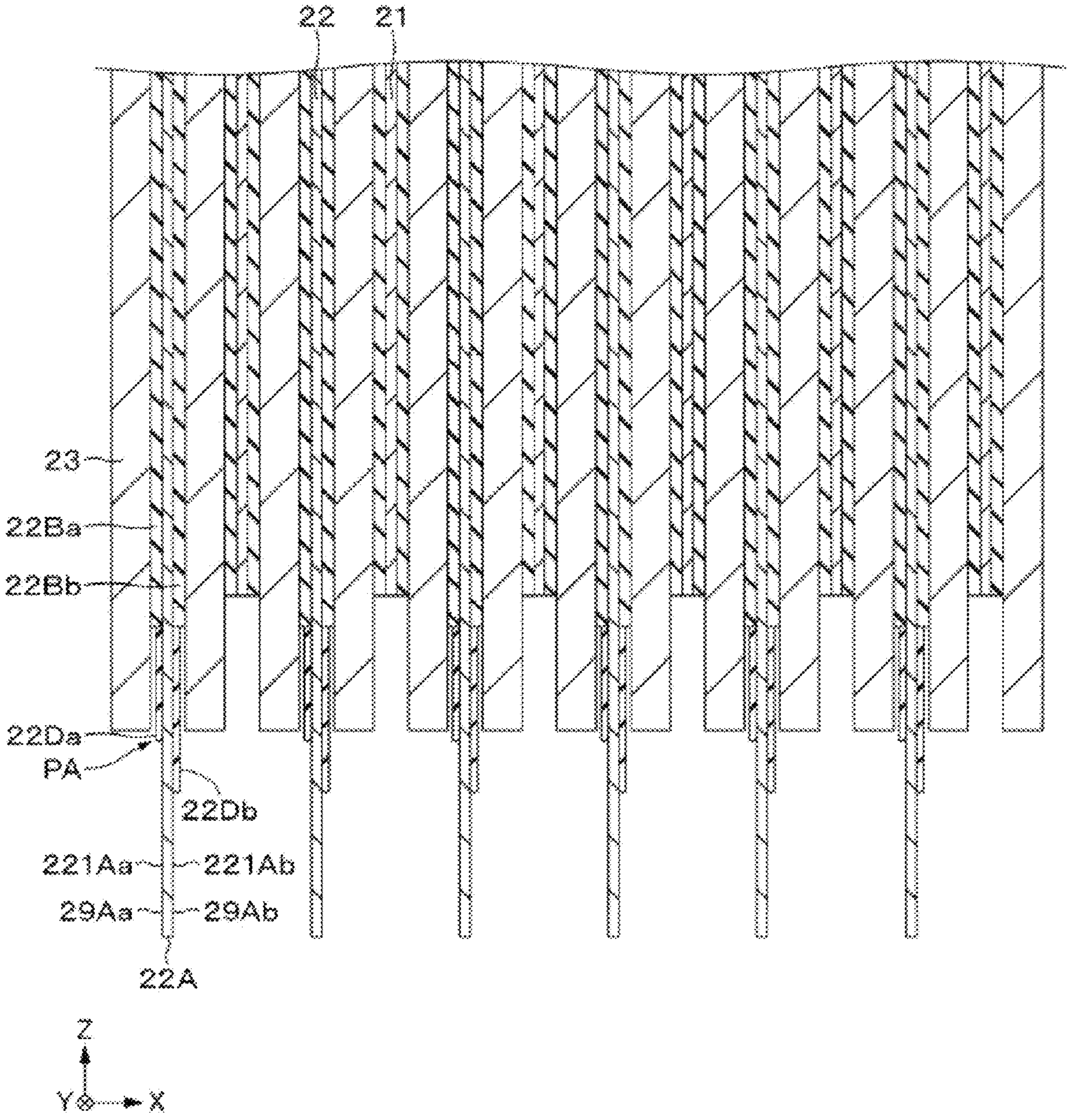
FIG. 8 is a diagram for describing details of a first insulating layer and a second insulating layer.
Figure 9:
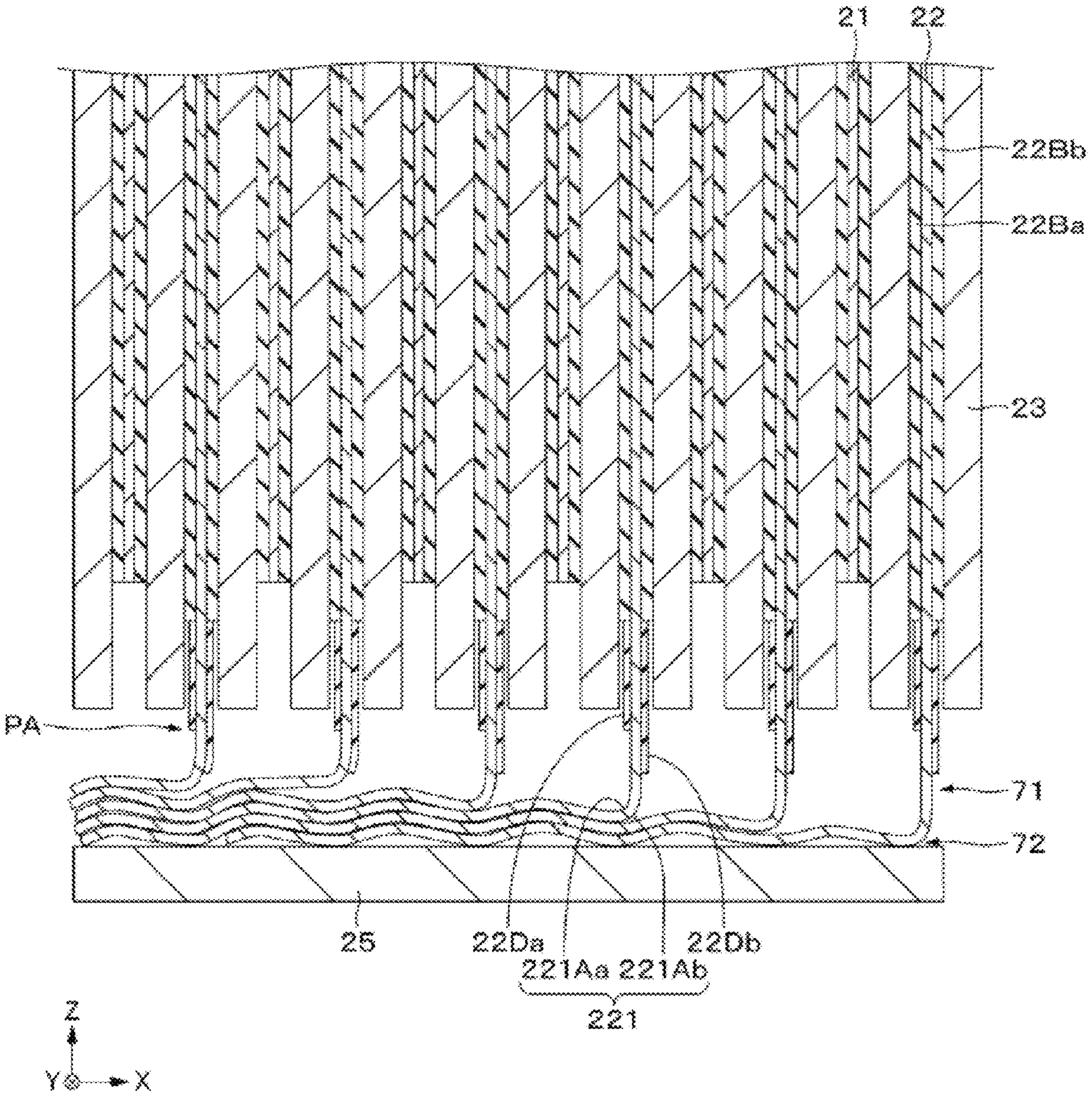
FIG. 9 is a diagram for describing the details of the first insulating layer and the second insulating layer.

Next, a description will be given of a bent part and a flat surface with reference to FIGS. 8 and 9. FIGS. 8 and 9 are partial sectional views of the negative electrode side of the electrode wound body 20. As illustrated in FIG. 8, the first insulating layer 22Da is smaller than the second insulating layer 22Db in length, i.e., length in the Z-axis direction in FIG. 8.

In the process of fabricating the lithium ion battery 1, the details of which will be described later, a load is applied to the negative electrode active material uncovered part (hereinafter referred to as a negative electrode active material uncovered part 221 as appropriate) including the negative electrode active material uncovered part 221Aa and the negative electrode active material uncovered part 221Ab. As the load is applied, as illustrated in FIG. 9, portions of respective layers of the negative electrode active material uncovered part 221 are each bent toward the central axis with an end of the first insulating layer 22Da as a bending point PA, and overlap with each other to form the flat surface 72. Further, grooves 43 to be described later are formed in a portion of the end face 42. The flat surface 72 and the negative electrode current collector plate 25 are coupled to each other by a method such as laser welding.

Figure 10:
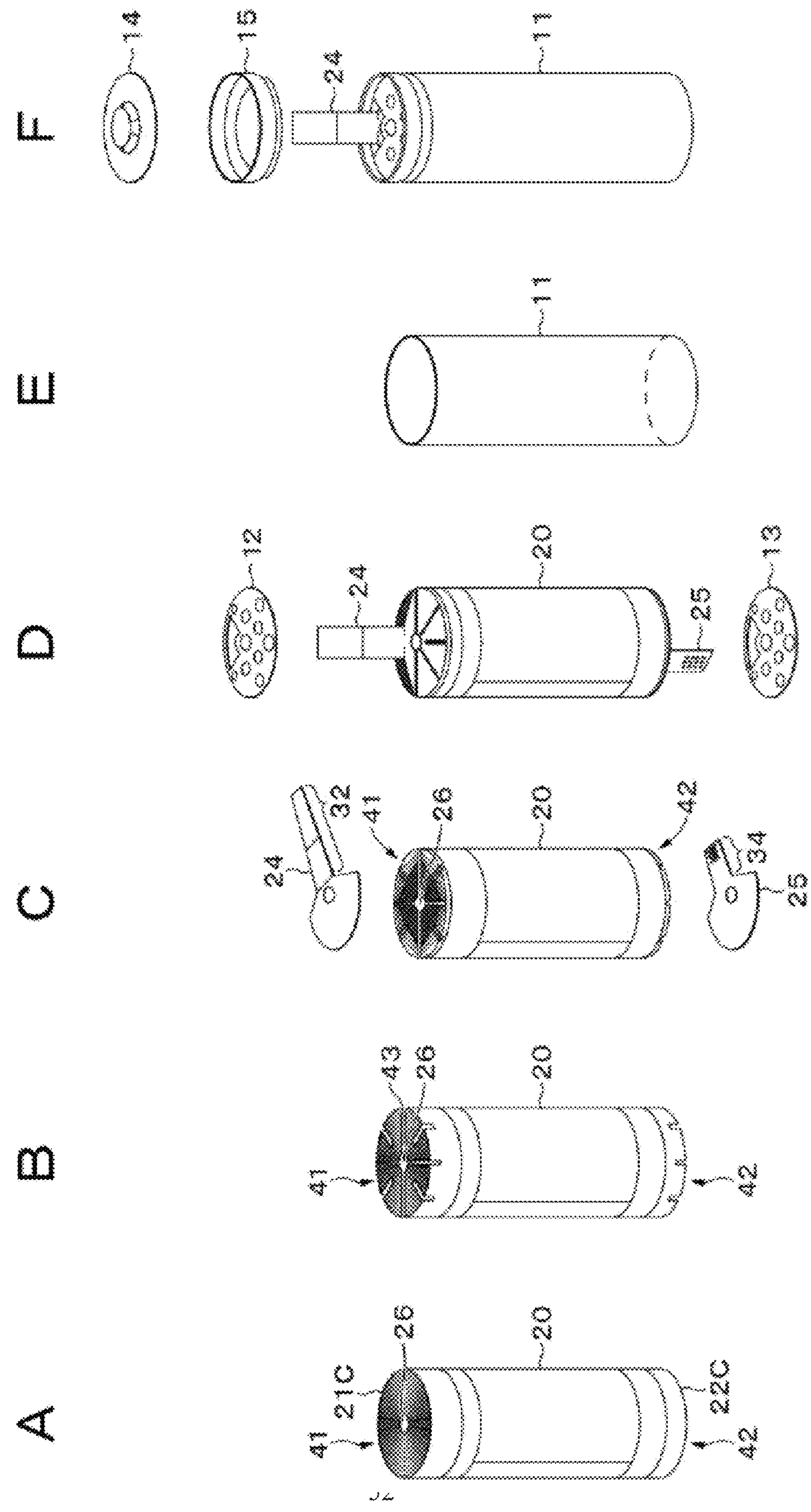
FIG. 10 includes views A to F which are diagrams describing a process of assembling the lithium ion battery according to an embodiment.

Next, a method of fabricating the lithium ion battery 1 according to an embodiment will be described with reference to FIG. 10, views A to F. First, the positive electrode active material was applied on the surfaces of the positive electrode foil 21A having a band shape to thereby form the positive electrode active material covered parts 21B, and the negative electrode active material was applied on the surfaces of the negative electrode foil 22A having a band shape to thereby form the negative electrode active material covered parts 22Ba and 22Bb. At this time, the positive electrode active material uncovered part 21C without the positive electrode active material applied thereon was provided on one end side in the width direction of the positive electrode foil 21A. The negative electrode active material covered part 22Ba and the first insulating layer 22Da were provided on the one major surface 29Aa of the negative electrode foil 22A. The major surface 29Aa was thus provided with the negative electrode active material uncovered parts 221Aa, 221Ba, and 221Ca. Further, the negative electrode active material covered part 22Bb and the second insulating layer 22Db were provided on the other major surface 29Ab of the negative electrode foil 22A. The major surface 29Ab was thus provided with the negative electrode active material uncovered parts 221Ab, 221Bb, and 221Cb. Thereafter, the positive electrode 21 and the negative electrode 22 were subjected to processes including a drying process. Thereafter, the positive electrode 21 and the negative electrode 22 were laid over each other with the separator 23 interposed therebetween in such a manner that the positive electrode active material uncovered part 21C and each of the negative electrode active material uncovered parts 221Aa and 221Ab faced toward opposite directions, and they were wound in a spiral shape to allow the through hole 26 to develop on the central axis. Thus, the electrode wound body 20 as illustrated in FIG. 10, view A was fabricated. The positive electrode active material uncovered part 21C is exposed at the one end face 41 of the electrode wound body 20 having the cylindrical shape. The negative electrode active material uncovered part 221 is exposed at the other end face 42. A region of the electrode wound body 20 including the end face 41 is referred to as the positive electrode side of the electrode wound body 20. The region of the electrode wound body 20 including the end face 42 is referred to as the negative electrode side of the electrode wound body 20.

Thereafter, the grooves 43 were formed, as illustrated in FIG. 10, view B, in a portion of each of the end faces 41 and 42 by pressing an edge of a thin flat plate or the like (having a thickness of 0.5 mm, for example) perpendicularly against each of the end faces 41 and 42. By this method, the grooves 43 were formed to extend radially from the through hole 26. Specifically, the grooves 43 were formed in each of a portion of the end face 41 on the positive electrode side and a portion of the end face 42 on the negative electrode side. For example, the grooves 43 extend from an outer edge part 27 of the end face 41 to the through hole 26, or from an outer edge part 28 of the end face 42 to the through hole 26. Note that the number and arrangement of the grooves 43 illustrated in FIG. 10, view B are merely one example, and the illustrated example is thus non-limiting.

Thereafter, the end faces 41 and 42 were made into flat surfaces by applying equal pressures to the end faces 41 and 42 simultaneously in directions substantially perpendicular thereto and thereby bending the positive electrode active material uncovered part 21C and the negative electrode active material uncovered part 221 toward the central axis of a wound structure. At this time, a load was applied to cause portions of the positive electrode active material uncovered part 21C that are located at the end face 41 to be bent toward the central axis and overlap with each other, and to cause portions of the negative electrode active material uncovered part 221 that are located at the end face 42 to be bent toward the central axis and overlap with each other. Thereafter, as illustrated in FIG. 10, view C, the fan-shaped part 31 of the positive electrode current collector plate 24 was coupled to the end face 41 by laser welding, and the fan-shaped part 33 of the negative electrode current collector plate 25 was coupled to the end face 42 by laser welding.

Thereafter, as illustrated in FIG. 10, view D, the band-shaped part 32 of the positive electrode current collector plate 24 and the band-shaped part 34 of the negative electrode current collector plate 25 were bent, the insulator 12 was attached to the positive electrode current collector plate 24, and the insulator 13 was attached to the negative electrode current collector plate 25. Thereafter, the electrode wound body 20 having been assembled in the above-described manner was placed into the battery can 11 illustrated in FIG. 10, view E, following which the negative electrode current collector plate 25 was welded to the bottom of the battery can 11 using a welding rod. The electrolytic solution was injected into the battery can 11, following which an opening of the battery can 11 was sealed with the gasket 15 and the battery cover 14, as illustrated in FIG. 10, view F. The lithium ion battery 1 was fabricated as described above.

Note that the insulators 12 and 13 may each be an insulating tape. Further, a method of the above-described coupling may be other than laser welding. Further, the grooves 43 may be coupled to a portion of the positive electrode current collector plate 24 or a portion of the negative electrode current collector plate 25.

As used herein, the term "flat surface" encompasses not only a completely flat surface but also a surface having some asperities or surface roughness to the extent that it is possible to couple the positive electrode active material uncovered part 21C and the positive electrode current collector plate 24 to each other and to couple the negative electrode active material uncovered part 221 and the negative electrode current collector plate 25 to each other.

In the present embodiment, the first insulating layer 22Da and the second insulating layer 22Db are provided and the length of the first insulating layer 22Da is made smaller than the length of the second insulating layer 22Db. This makes it possible for the negative electrode active material uncovered part 221 in each layer to be easily bent toward the central axis of the electrode wound body 20, with the end of the first insulating layer 22Da as the bending point PA. That is, portions of the negative electrode active material uncovered part 221 in respective layers are bent uniformly toward the central axis of the electrode wound body 20, which results in no creases or voids (gaps or spaces) and thus allows for improvement in flatness of the flat surface 72. Accordingly, it is possible to couple the negative electrode current collector plate 25 and the flat surface 72 to each other with stability, and to suppress the occurrence of a welding defect. Note that the "creases" and "voids" are unevenness that can develop in the negative electrode active material uncovered part 221 having been bent, resulting in a level difference in the surface to generate non-flat portions in the flat surface 72.

There is a possibility of generation of a small amount of metal powder from the negative electrode active material uncovered part 221 upon bending of the negative electrode active material uncovered part 221 or during formation of the grooves 43. If the metal powder enters the inside of the electrode wound body 20, an internal short circuit can result. In the present embodiment, the provision of the first insulating layer 22Da and the second insulating layer 22Db reduces exposure of the negative electrode foil 22A in the vicinity of the bending point PA. This helps to suppress the generation of the metal powder described above.

The first insulating layer 22Da and the second insulating layer 22Db may each include a metal having an X-ray shielding effect higher than that of the metal included in the negative electrode foil 22A, or a metal compound including a metal having an X-ray shielding effect higher than that of the metal included in the negative electrode foil 22A. This makes it possible to identify respective positions of the first insulating layer 22Da and the second insulating layer 22Db. Specifically, it is possible to identify the respective positions of the first insulating layer 22Da and the second insulating layer 22Db based on X-ray radiographs obtained by irradiating these insulating layers with X-rays. Further, it also becomes possible to identify the end of each of the negative electrode active material covered parts 22Ba and 22Bb, which makes it possible to inspect the lithium ion battery 1 for any winding misalignment between the positive electrode 21 and the negative electrode 22, i.e., a state where the positive electrode active material covered part 21B and the negative electrode active material covered part 22Ba are not opposed to each other. Because it becomes possible to perform inspection for winding misalignment, it becomes unnecessary for a length of the positive electrode active material covered part 21B in the width direction to be set to a small value to be on the safe side. Accordingly, it is possible to increase the length of the positive electrode active material covered part 21B in the width direction. This allows for an increase in battery capacity of the lithium ion battery 1.

During fabrication of the lithium ion battery 1, the negative electrode active material can sometimes peel off the negative electrode active material covered part 22Ba on the beginning side of winding of the electrode wound body 20, i.e., an end side in the longitudinal direction of the negative electrode located in an innermost wind of the electrode wound body 20, when the edge of a thin flat plate or the like (having a thickness of 0.5 mm, for example) is pressed in a perpendicular direction against each of the end faces 41 and 42, that is, when the process illustrated in FIG. 10B is performed. A possible cause of the peeling is stress generated upon pressing the above-described flat plate against the end face 42. The negative electrode active material having peeled off can enter the inside of the electrode wound body 20 and can thereby cause an internal short circuit of the lithium ion battery 1. According to the present embodiment, the provision of the negative electrode active material uncovered parts 221Ba and 221Bb helps to effectively prevent the peeling of the negative electrode active material, thereby helping to prevent the occurrence of the internal short circuit. Such an effect is achievable even with a configuration in which only either the negative electrode active material uncovered part 221Ba or the negative electrode active material uncovered part 221Bb is provided; however, it is preferable that both be provided.

On the end side of the winding of the electrode wound body 20, the negative electrode 22 may have a region of the negative electrode active material uncovered part at a major surface facing away from the positive electrode active material covered part 21B. A reason for this is that even if the negative electrode active material covered part is present at the major surface facing away from the positive electrode active material covered part 21B, its contribution to charging and discharging is considered to be low. The region of the negative electrode active material uncovered part preferably falls within a range from 3/4 winds to 5/4 winds, both inclusive, of the electrode wound body 20. In this case, owing to the absence of the negative electrode active material covered part 22Ba that is low in contribution to charging and discharging, it is possible to make an initial capacity higher with respect to the same volume of the electrode wound body 20.

According to the present embodiment, in the electrode wound body 20, the positive electrode 21 and the negative electrode 22 are laid over each other and wound in such a manner that the positive electrode active material uncovered part 21C and each of the negative electrode active material uncovered parts 221Aa and 221Ab face toward opposite directions. Thus, the positive electrode active material uncovered part 21C is localized to the end face 41, and the negative electrode active material uncovered part 221 is localized to the end face 42 of the electrode wound body 20. The positive electrode active material uncovered part 21C and the negative electrode active material uncovered part 221 are bent to make the end faces 41 and 42 into flat surfaces. The direction of bending is from the outer edge part 27 of the end face 41 toward the central axis, or from the outer edge part 28 of the end face 42 toward the central axis. Portions of the active material uncovered part that are located in adjacent winds in a wound state overlap with each other. By making the end face 41 into a flat surface, it is possible to achieve better contact between the positive electrode active material uncovered part 21C and the positive electrode current collector plate 24. By making the end face 42 into a flat surface, it is possible to achieve better contact between the negative electrode active material uncovered part 221 and the negative electrode current collector plate 25. Further, the configuration in which the end faces 41 and 42 are made into flat surfaces makes it possible for the lithium ion battery 1 to achieve reduced resistance.

It may seem to be possible to make the end faces 41 and 42 into flat surfaces by bending the positive electrode active material uncovered part 21C and the negative electrode active material uncovered part 221. However, without any processing in advance of bending, creases or voids (gaps or spaces) can develop in the end faces 41 and 42, thus making it difficult for the end faces 41 and 42 to be flat surfaces. In the present embodiment, the grooves 43 are formed in advance in radial directions from the through hole 26 on each of the end face 41 side and the end face 42 side. The presence of the grooves 43 helps to prevent the creases and voids from developing, and thereby helps to achieve increased flatness of the end faces 41 and 42.

EXAMPLES

In the following, the present application will be described in further detail, according to an embodiment, including with reference to Examples and comparative examples in which the lithium ion batteries 1 fabricated in the above-described manner were each evaluated for a welding defect rate. Note that the present application is not limited to Examples described below.

Figure 11:
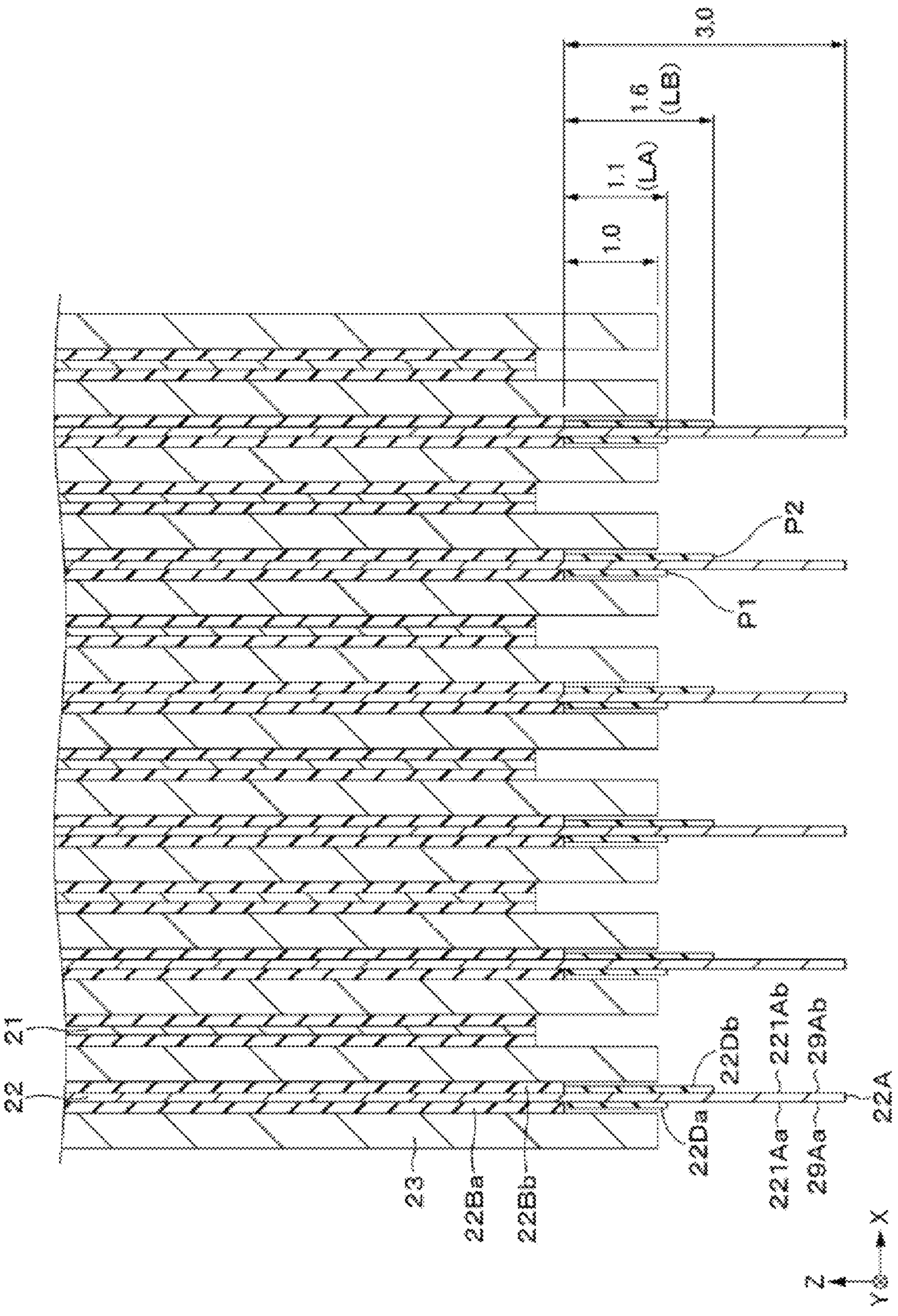
FIG. 11 is a diagram for describing Example 1.

For each of Examples and the comparative examples described below, a battery size was set to 21700 (21 mm in diameter and 70 mm in height), a length of the positive electrode active material covered part 21B in the longitudinal direction was set to 1320 mm, a length of each of the negative electrode active material covered parts 22Ba and 22Bb in the longitudinal direction was set to 1400 mm, a length of each of the negative electrode active material covered parts 22Ba and 22Bb in the width direction was set to 63 mm, and a length of the separator 23 in the width direction was set to 64 mm. The separator 23 was placed to cover all of regions of the positive electrode active material covered part 21B and the negative electrode active material covered parts 22Ba and 22Bb. Further, as illustrated in FIG. 11, the electrode wound body was fabricated with the length (D6 in FIG. 6) from the end of each of the negative electrode active material covered parts 22Ba and 22Bb to the end of the negative electrode foil 22A, i.e., the length of a region without the negative electrode active material applied thereon, set to 3.0 mm, and with a distance from the end of each of the negative electrode active material covered parts 22Ba and 22Bb to the end of the separator 23, which is also referred as a clearance and is the distance D10 in FIG. 6, set to 1.0 mm. Further, the number of the grooves 43 was set to eight, and the eight grooves were arranged at substantially equal angular intervals.

Figure 12:
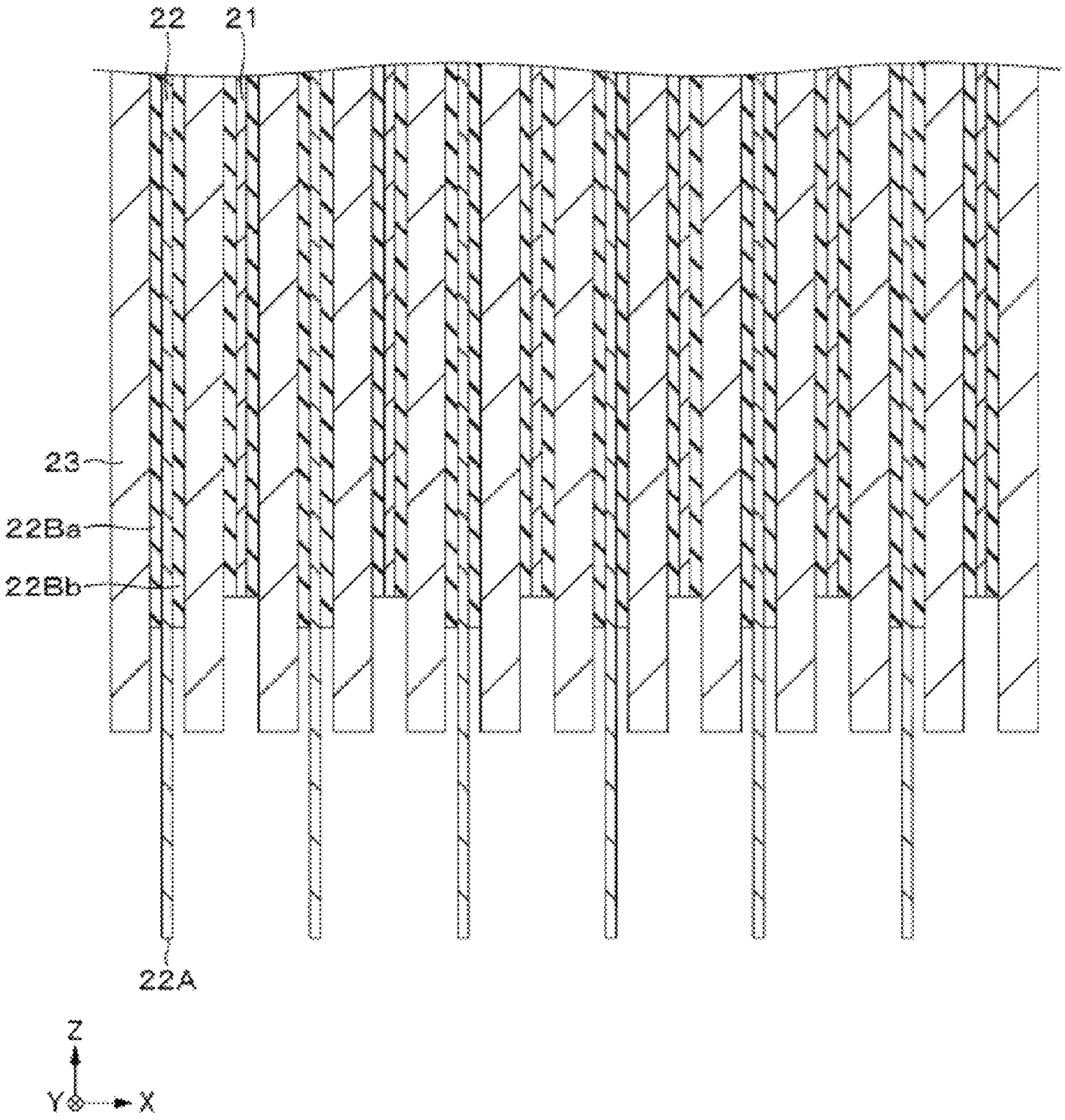
FIG. 12 is a diagram for describing Comparative example 1.
Figure 13:
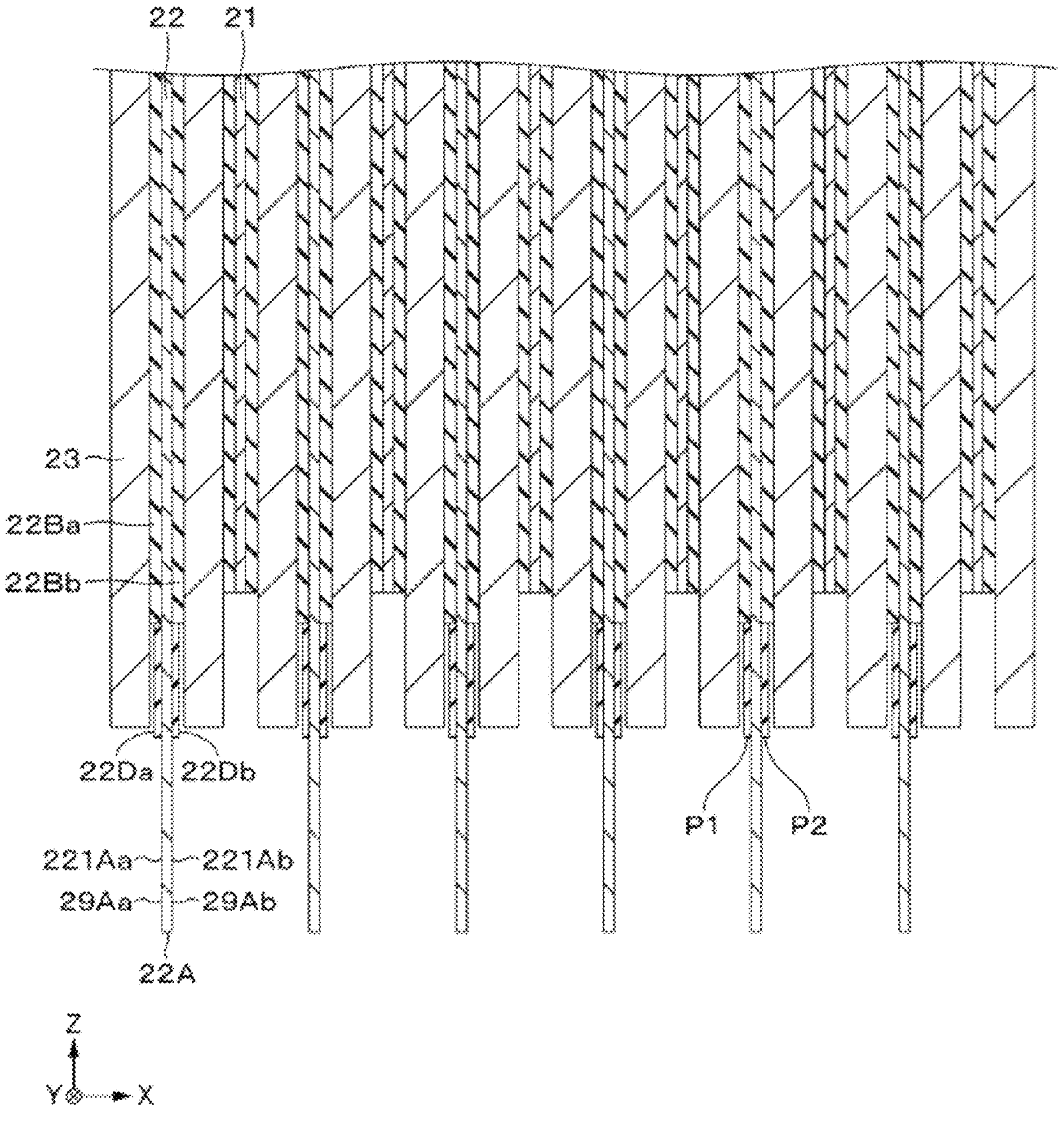
FIG. 13 is a diagram for describing Comparative example 2.
Figure 14:
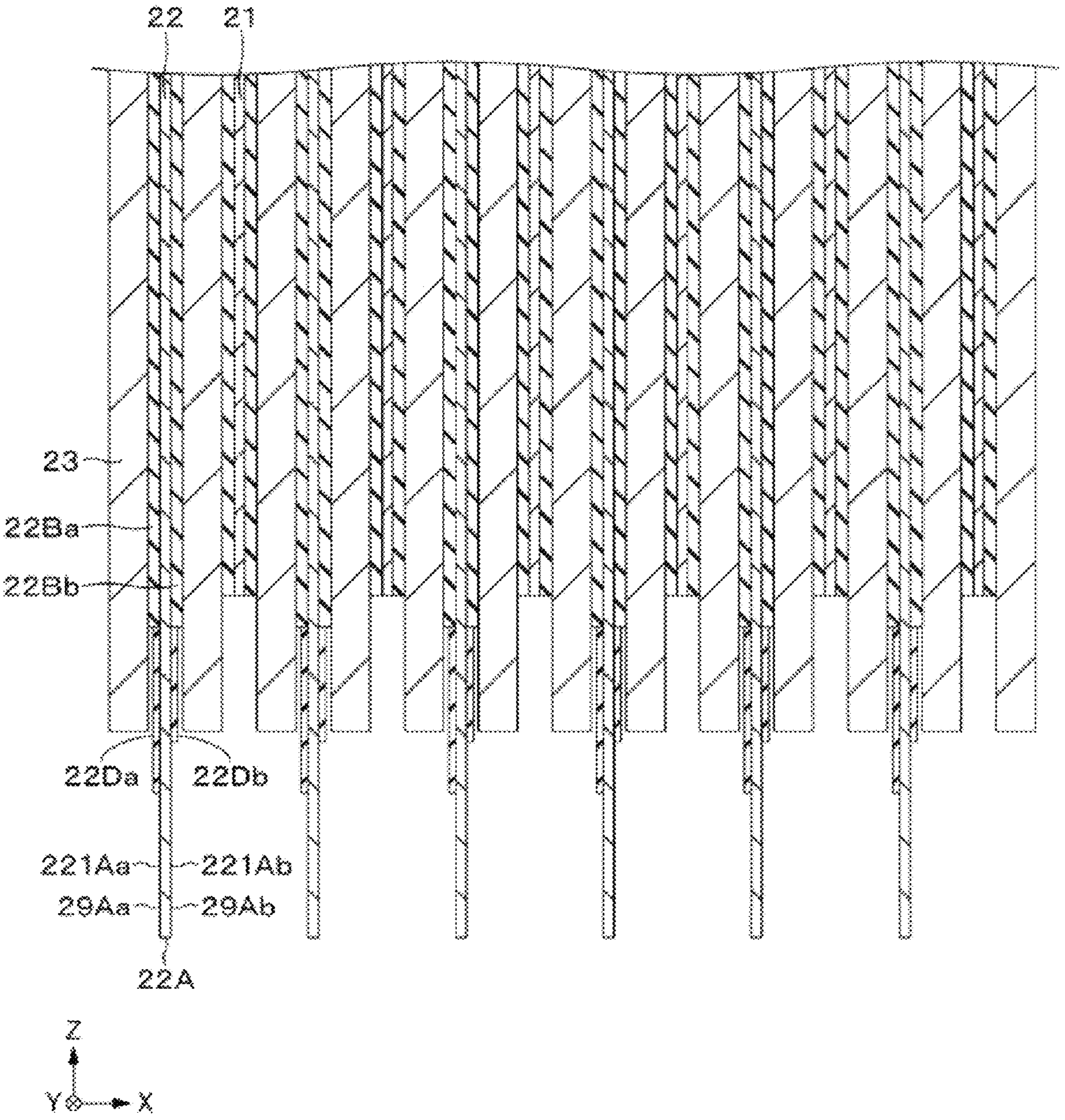
FIG. 14 is a diagram for describing Comparative example 3.

FIG. 11 corresponds to Example 1, FIG. 12 corresponds to Comparative example 1, FIG. 13 corresponds to Comparative example 2, and FIG. 14 corresponds to Comparative example 3.

Example 1

The lithium ion battery 1 was fabricated through the above-described process. In fabricating the lithium ion battery 1, as illustrated in FIGS. 8 and 9, the first insulating layer 22Da was provided on the one major surface 29Aa of the negative electrode foil 22A, and the second insulating layer 22Db was provided on the other major surface 29Ab of the negative electrode foil 22A. As illustrated in FIG. 11, the length LA (the length in the Z-axis direction in FIG. 11) of the first insulating layer 22Da was set to be smaller than the length LB (the length in the Z-axis direction in FIG. 11) of the second insulating layer 22Db. Specifically, the length LA of the first insulating layer 22Da was set to 1.1 mm, and the length LB of the second insulating layer 22Db was set to 1.6 mm.

For Example 1 and Comparative examples 2 and 3, the length of each of the insulating layers was measured in the following manner.

The electrode wound body 20 having been fabricated was disassembled, and a distance from a terminal end of the negative electrode active material covered part 22Ba (i.e., a boundary between the negative electrode active material covered part 22Ba and the negative electrode active material uncovered part 22Ca) to an end P1 of the first insulating layer 22Da was measured microscopically. Measurement was performed at five points at intervals of 10 mm in the vicinity of a middle of the negative electrode 22 in the longitudinal direction. A distance from a terminal end of the negative electrode active material covered part 22Bb (i.e., a boundary between the negative electrode active material covered part 22Bb and the negative electrode active material uncovered part 22Cb) to an end P2 of the second insulating layer 22Db was measured microscopically at five points similarly to the above. Respective averages of the two kinds of measurement results were determined as the length LA of the first insulating layer 22Da and the length LB of the second insulating layer 22Db.

The presence or absence of creases or voids (gaps or spaces) at each of the end faces 41 and 42 of the electrode wound body 20 was checked microscopically.

The first insulating layer 22Da and the second insulating layer 22Db were each formed by applying a coating material including PVDF, particles of barium sulfate, and NMP, and drying the coating film.

Comparative Example 1

In Comparative example 1, as illustrated in FIG. 12, neither of the first insulating layer 22Da and the second insulating layer 22Db was provided. The lithium ion battery was fabricated in a manner similar to that in Example 1 except for the above difference.

Comparative Example 2

In Comparative example 2, as illustrated in FIG. 13, the length LA (the length in the Z-axis direction in FIG. 13) of the first insulating layer 22Da was set to be equal to the length LB (the length in the Z-axis direction in FIG. 13) of the second insulating layer 22Db. Specifically, the length LA of the first insulating layer 22Da and the length LB of the second insulating layer 22Db were set to 1.1 mm. The lithium ion battery was fabricated in a manner similar to that in Example 1 except for the above difference.

Comparative Example 3

In Comparative example 3, as illustrated in FIG. 14, the length LA (the length in the Z-axis direction in FIG. 14) of the first insulating layer 22Da was set to be greater than the length LB (the length in the Z-axis direction in FIG. 14) of the second insulating layer 22Db. Specifically, the length LA of the first insulating layer 22Da was set to 1.6 mm, and the length LB of the second insulating layer 22Db was set to 1.1 mm. The lithium ion battery was fabricated in a manner similar to that in Example 1 except for the above difference.

A visual inspection was performed after the negative electrode current collector plate 25 was laser-welded. The electrode wound body having perforation in a surface of the negative electrode current collector plate 25, and the electrode wound body in which the first insulating layer 22Da, the second insulating layer 22Db, or both had turned black due to heat from welding when observed after removing the negative electrode current collector plate 25 away were each judged to have a welding defect. For each of Example 1 and Comparative examples 1 to 3, two hundred electrode wound bodies were fabricated and a sum of the electrode wound bodies having welding defects divided by the total number of the electrode wound bodies was defined as the welding defect rate. The results are given in Table 1 below.

TABLE 1

| | Magnitude relationship between length LA of first insulating layer and length LB of second insulating layer | Corresponding FIG. | Welding defect rate [%] |
|---|---|---|---|
| Example 1 | LA < LB | FIG. 11 | 0.5 |
| Comparative example 1 | None | FIG. 12 | 4.0 |
| Comparative example 2 | LA = LB | FIG. 13 | 3.5 |
| Comparative example 3 | LA > LB | FIG. 14 | 5.5 |

The welding defect rate in Example 1 was markedly low as compared with the welding defect rate in each of Comparative examples 1 to 3. In Example 1, owing to satisfaction of the relationship LA<LB, portions of the negative electrode active material uncovered part 221 were each bent at the bending point PA toward the center and overlapped with each other substantially uniformly, and as a result, there were hardly any "creases" or "voids (gaps or spaces)" at the flat surface 72. That is, for Example 1, it is considered that the improved flatness of the flat surface 72 markedly reduced the frequency of occurrence of perforation in the current collector plate upon laser welding, and thus resulted in the reduced welding defects.

Figure 15:
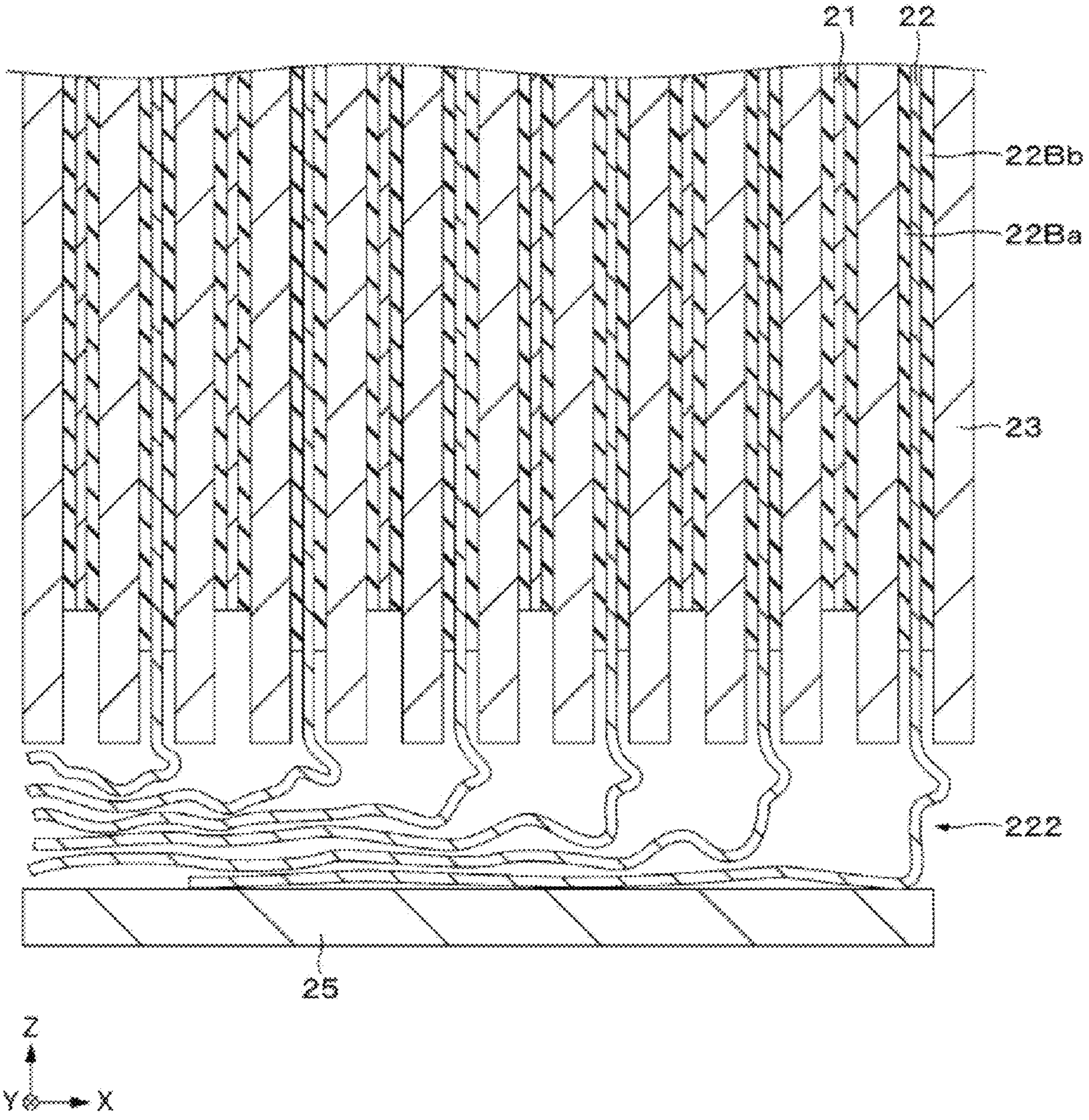
FIG. 15 is a diagram for describing Comparative example 1.

In Comparative example 1, the welding defect rate was as high as 4.0%. In Comparative example 1, a plurality of regions with "creases" or "voids (gaps or spaces)" developed at the flat surface 72. A possible reason for this is as follows. Because of the absence of the first insulating layer 22Da and the second insulating layer 22Db, the bending point was unstable and accordingly, as illustrated in FIG. 15, the negative electrode active material uncovered part (a negative electrode active material uncovered part 222 in FIG. 15) exhibited a random bending behavior. It is considered that this resulted in the development of the regions with the "creases" or "voids (gaps or spaces)" at the flat surface 72. The flatness of the flat surface 72 thus decreased to cause the surface of the negative electrode current collector plate 25 to include one or more portions with which the negative electrode active material uncovered part 222 was not in contact upon laser welding. It is considered that this resulted in perforation due to excessive concentration of thermal energy on the negative electrode current collector plate 25, or resulted in one or more unwelded portions, and thus increased the welding defect rate.

Figure 16:
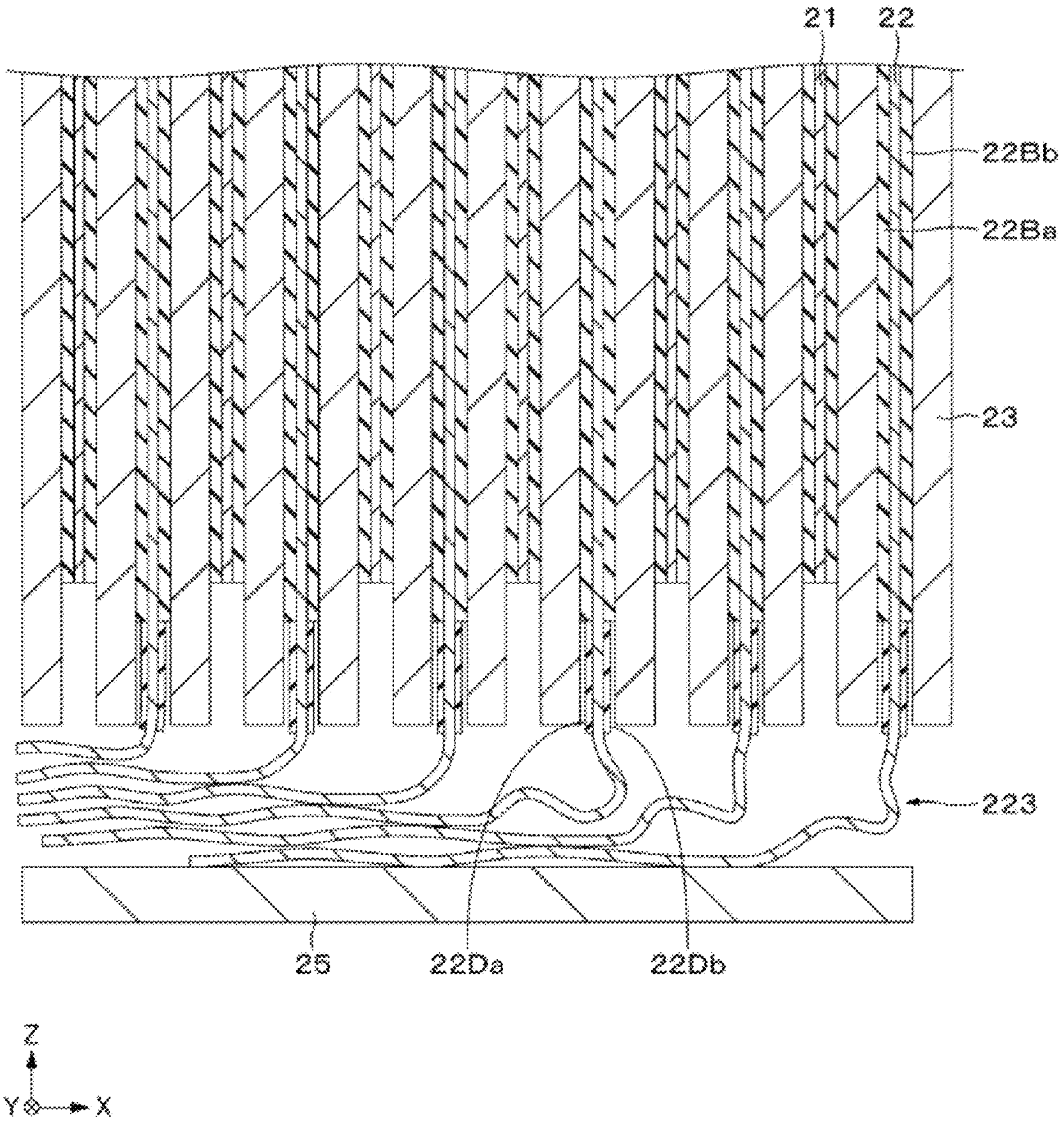
FIG. 16 is a diagram for describing Comparative example 2.

In Comparative example 2, the welding defect rate was as high as 3.5%. In Comparative example 2, a plurality of regions with “creases” or “voids (gaps or spaces)” developed at the flat surface 72. A possible reason for this is as follows. Because the lengths LA and LB were equal, the bending point was unstable and accordingly, as illustrated in FIG. 16, the negative electrode active material uncovered part (a negative electrode active material uncovered part 223 in FIG. 16) exhibited a random bending behavior, as with the case without the first insulating layer 22Da and the second insulating layer 22Db. It is considered that this resulted in the development of the regions with the “creases” or “voids (gaps or spaces)” at the flat surface 72. The flatness of the flat surface 72 thus decreased to cause the surface of the negative electrode current collector plate 25 to include one or more portions with which the negative electrode active material uncovered part 223 was not in contact upon laser welding. It is considered that this resulted in perforation due to excessive concentration of thermal energy on the negative electrode current collector plate 25, or resulted in one or more unwelded portions, and thus increased the welding defect rate.

Figure 17:
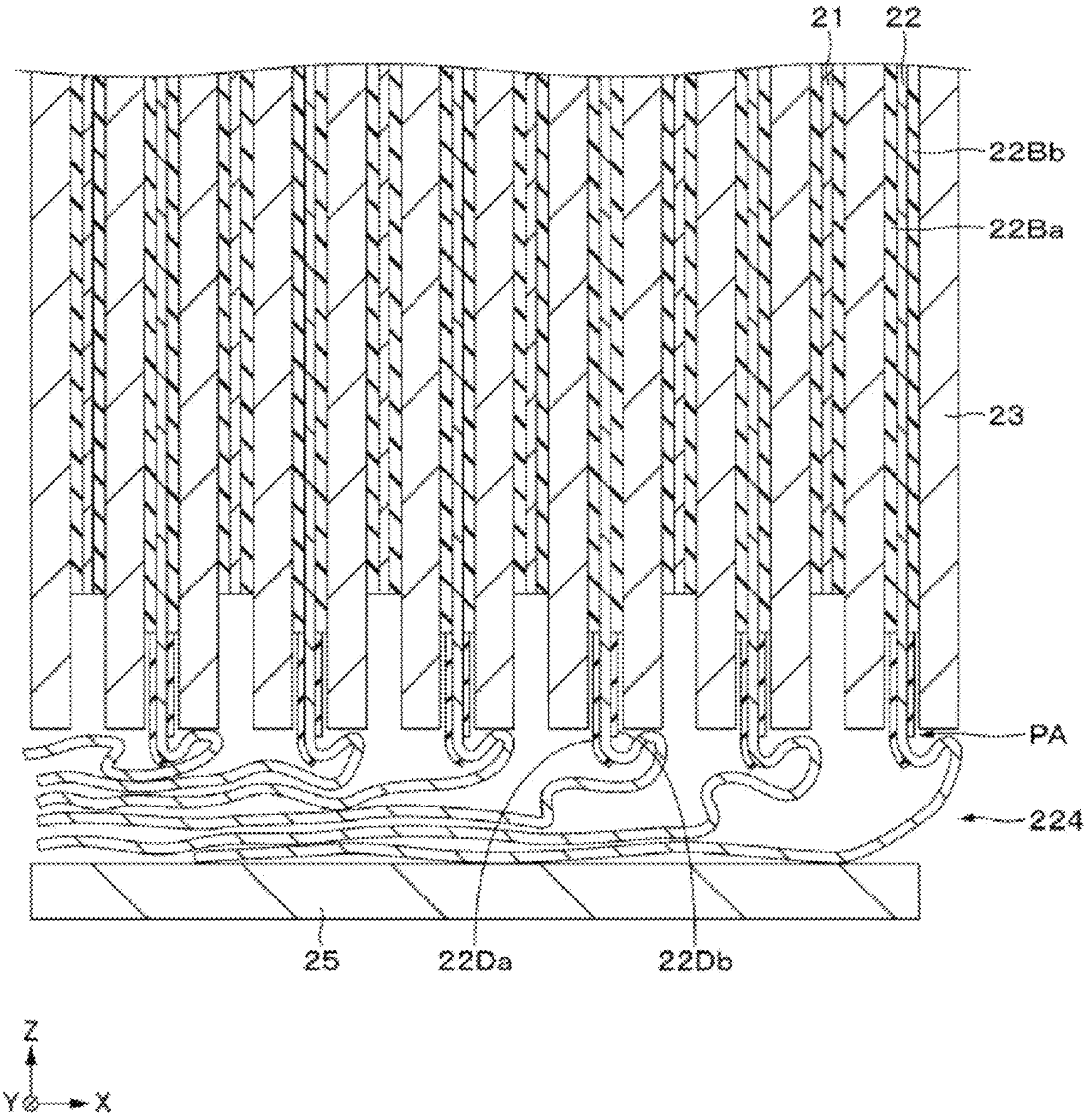
FIG. 17 is a diagram for describing Comparative example 3.

In Comparative example 3, the welding defect rate was 5.5%, which was higher than that in each of Comparative examples 1 and 2. In Comparative example 3, a larger number of regions with “creases” or “voids (gaps or spaces)” developed at the flat surface 72 than in each of Comparative examples 1 and 2. A possible reason for this is as follows. Because the length LA was larger than the length LB, the bending point PA was on an outer side of a negative electrode active material uncovered part 224 as illustrated in FIG. 17, and accordingly, when the negative electrode active material uncovered part 224 was bent, the negative electrode active material uncovered part 224 markedly exhibited a behavior of once bending outward. It is considered that this resulted in unstable overlapping of the portions of the negative electrode active material uncovered part 224, which generated the larger number of regions with “creases” or “voids (gaps or spaces)” than in each of Comparative examples 1 and 2, not to mention Example 1, and thus markedly increased the welding defect rate.

Based upon the above, the configuration corresponding to Example 1 is considered to be a preferable configuration of the lithium ion battery 1.

Next, an investigation was carried out as to a change in welding defect rate when LA was set to be smaller than LB and the difference between LA and LB was varied.

The difference between LA and LB was investigated as follows. Barium sulfate was mixed into the material of the first insulating layer 22Da and the second insulating layer 22Db to apply the resulting mixture. The electrode wound body thus fabricated was irradiated with X-rays. Based on an obtained X-ray radiograph, the positions of the first insulating layer 22Da and the second insulating layer 22Db were identified. The position of the second insulating layer 22Db was identified based on a dark portion of a contrast of the X-ray radiograph, i.e., a portion indicating the formation of the respective insulating layers on both of the major surface 29Aa and the major surface 29Ab, and the position of the first insulating layer 22Da was identified based on a light portion of the contrast of the X-ray radiograph, which indicates the insulating layer at a difference portion between the first insulating layer 22Da and the second insulating layer 22Db. LA and LB were each measured in a manner similar to that in Example 1.

A ratio of LA to LB was calculated as a percentage obtained by dividing LA by LB.

Further, the welding defect rate was defined similarly to Example 1, etc.

Example 2

In Example 2, the length LA of the first insulating layer 22Da was set to 1.1 mm, and the length LB of the second insulating layer 22Db was set to 1.15 mm. The lithium ion battery was fabricated in a manner similar to that in Example 1 except for the above difference.

Example 3

In Example 3, the length LA of the first insulating layer 22Da was set to 1.1 mm, and the length LB of the second insulating layer 22Db was set to 1.2 mm. The lithium ion battery was fabricated in a manner similar to that in Example 1 except for the above difference.

Example 4

In Example 4, the length LA of the first insulating layer 22Da was set to 1.1 mm, and the length LB of the second insulating layer 22Db was set to 2.1 mm. The lithium ion battery was fabricated in a manner similar to that in Example 1 except for the above difference.

Example 5

In Example 5, the length LA of the first insulating layer 22Da was set to 1.1 mm, and the length LB of the second insulating layer 22Db was set to 2.2 mm. The lithium ion battery was fabricated in a manner similar to that in Example 1 except for the above difference.

The results are given in Table 2 below.

TABLE 2

| | Difference [mm] between length LA of first insulating layer and length LB of second insulating layer (LB − LA) | Ratio [%] of LA to LB | Welding defect rate [%] |
|---|---|---|---|
| Example 2 | 0.05 | 95.65 | 2.0 |
| Example 3 | 0.1 | 91.67 | 0.5 |
| Example 4 | 1.0 | 52.38 | 0.5 |
| Example 5 | 1.1 | 50.00 | 1.0 |

In Example 2 in which the difference between LA and LB was 0.05 mm and the ratio of LA to LB was 95.65%, the welding defect rate was 2.0%. The welding defect rate was lower than in Comparative examples 1 to 3; however, because the difference between LA and LB was small, some electrode wound bodies exhibited a behavior similar to that of the electrode wound body in Comparative example 2 (LA=LB). As a result, the welding defect rate was somewhat high.

In each of Example 3 in which the difference between LA and LB was 0.1 mm and the ratio of LA to LB was 91.67% and Example 4 in which the difference between LA and LB was 1.0 mm and the ratio of LA to LB was 52.38%, the negative electrode active material uncovered part 221 exhibited a bending behavior or mode similar to that in Example 1, and the flatness of the flat surface 72 thus improved. As a result, the welding defect rate in each of Examples 3 and 4 was 0.5%, which was as low as that in Example 1.

In Example 5 in which the difference between LA and LB was 1.1 mm and the ratio of LA to LB was 50.00%, the welding defect rate was 1.0%. The bending behavior of the negative electrode active material uncovered part 221 was similar to that in Example 3 or 4; however, disassembling the electrode wound body 20 revealed that the second insulating layer 22Db had partly turned black. Further, some second insulating layers 22Db each included a portion having a gap from the negative electrode active material uncovered part 221 adjacent thereto. As a result, the welding defect rate was somewhat high.

Based upon the above, it is preferable to employ a configuration in which the ratio of LA to LB is in a range from 52% to 92% both inclusive, more preferably in a range from 52.38% to 91.67% both inclusive, or in which LA<LB and the difference between LA and LB is in a range from 0.1 mm to 1.0 mm both inclusive.

Although one or more embodiments of the present application have been described herein, the contents of the present application are not limited thereto, and various modifications may be made.

The present technology is also applicable to a battery of a tabless structure in which the positive electrode active material uncovered part 21C is not bent. Although a configuration having the negative electrode active material uncovered parts 221Ba and 221Bb and the negative electrode active material uncovered parts 221Ca and 221Cb is preferable, the present technology is also applicable to a lithium ion battery including none of these parts.

Although the number of the grooves 43 is eight in Examples and the comparative examples, any other number may be chosen. Although the battery size chosen is 21700 (21 mm in diameter and 70 mm in height), the battery size may be 18650 (18 mm in diameter and 65 mm in height) or any other size.

The fan-shaped parts 31 and 33 may each have a shape other than the fan shape.

The technology is applicable to any suitable battery including the lithium ion battery, and to any battery having a cylindrical shape or any other suitable shape, such as a laminated battery, a prismatic battery, a coin-type battery, or a button-type battery, without departing from the scope of the present application. In such a case, the shape of the "end face of the electrode wound body" is not limited to a circular shape, and may be any of other shapes including, without limitation, an elliptical shape and an elongated shape.

Figure 18:
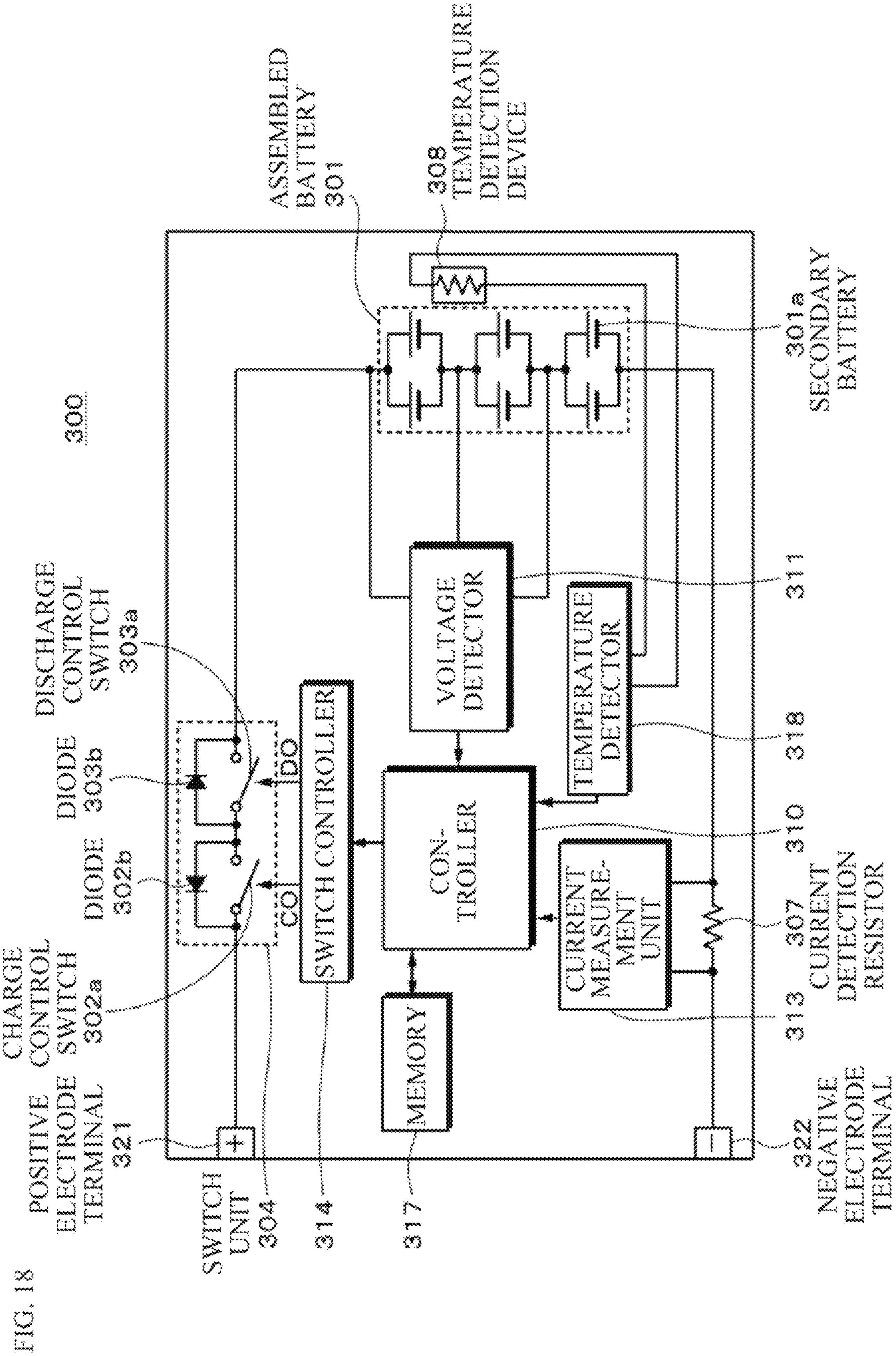
FIG. 18 is a coupling diagram for use to describe a battery pack as an application example according to an embodiment.

FIG. 18 is a block diagram illustrating a circuit configuration example where the secondary battery according to an embodiment is applied to a battery pack 300. The battery pack 300 includes an assembled battery 301, a switch unit 304, a current detection resistor 307, a temperature detection device 308, and a controller 310. The switch unit 304 includes a charge control switch 302*a* and a discharge control switch 303*a*. The controller 310 controls each device. Further, the controller 310 is able to perform charge and discharge control upon abnormal heat generation, and to perform calculation and correction of a remaining capacity of the battery pack 300. The battery pack 300 includes a positive electrode terminal 321 and a negative electrode terminal 322 that are couplable to a charger or electronic equipment for charging and discharging.

The assembled battery 301 includes multiple secondary batteries 301*a* coupled in series or in parallel. FIG. 18 illustrates an example case in which six secondary batteries 301*a* are coupled in a two parallel coupling and three series coupling (2P3S) configuration. The secondary battery according to an embodiment is applicable to the secondary battery 301*a*.

A temperature detector 318 is coupled to the temperature detection device 308 (for example, a thermistor). The temperature detector 318 measures a temperature of the assembled battery 301 or the battery pack 300, and supplies the measured temperature to the controller 310. A voltage detector 311 measures a voltage of the assembled battery 301 and a voltage of each of the secondary batteries 301*a* included therein, performs A/D conversion on the measured voltages, and supplies the converted voltages to the controller 310. A current measurement unit 313 measures currents using the current detection resistor 307, and supplies the measured currents to the controller 310.

A switch controller 314 controls the charge control switch 302*a* and the discharge control switch 303*a* of the switch unit 304 based on the voltages and the currents respectively supplied from the voltage detector 311 and the current measurement unit 313. When the voltage of any of the secondary batteries 301*a* becomes higher than or equal to an overcharge detection voltage or becomes lower than or equal to an overdischarge detection voltage, the switch controller 314 transmits a turn-off control signal to the switch unit 304 to thereby prevent overcharging or overdischarging. The overcharge detection voltage is, for example, 4.20 V±0.05 V. The overdischarge detection voltage is, for example, 2.4 V±0.1 V.

After the charge control switch 302*a* or the discharge control switch 303*a* is turned off, charging or discharging is enabled only through a diode 302*b* or a diode 303*b*. Semiconductor switches such as MOSFETs are employable as these charge and discharge control switches. Note that although the switch unit 304 is provided on a positive side in FIG. 18, the switch unit 304 may be provided on a negative side.

A memory 317 includes a RAM and a ROM. Numerical values including, for example, battery characteristic values, a full charge capacity, and a remaining capacity calculated by the controller 310 are stored and rewritten therein.

The secondary battery according to an embodiment is mountable on equipment such as electronic equipment, electric transport equipment, or a power storage apparatus, and is usable to supply electric power.

Examples of the electronic equipment include laptop personal computers, smartphones, tablet terminals, personal digital assistants (PDAs) (mobile information terminals), mobile phones, wearable terminals, digital still cameras, electronic books, music players, game machines, hearing aids, electric tools, televisions, lighting equipment, toys, medical equipment, and robots. In addition, for example, electric transport equipment, power storage apparatuses, and electric unmanned aerial vehicles, which will be described later, may also be included in the electronic equipment in a broad sense.

Examples of the electric transport equipment include electric automobiles (including hybrid electric automobiles), electric motorcycles, electric-assisted bicycles, electric buses, electric carts, automated guided vehicles (AGVs), and railway vehicles. Examples of the electric transport equipment further include electric passenger aircrafts and electric unmanned aerial vehicles for transportation. The secondary battery according to an embodiment is used not only as a driving power source for the foregoing electric transport equipment but also as, for example, an auxiliary power source or an energy-regenerative power source therefor.

Examples of the power storage apparatuses include a power storage module for commercial or household use, and a power storage power source for architectural structures including residential houses, buildings, and offices, or for power generation facilities.

Figure 19:
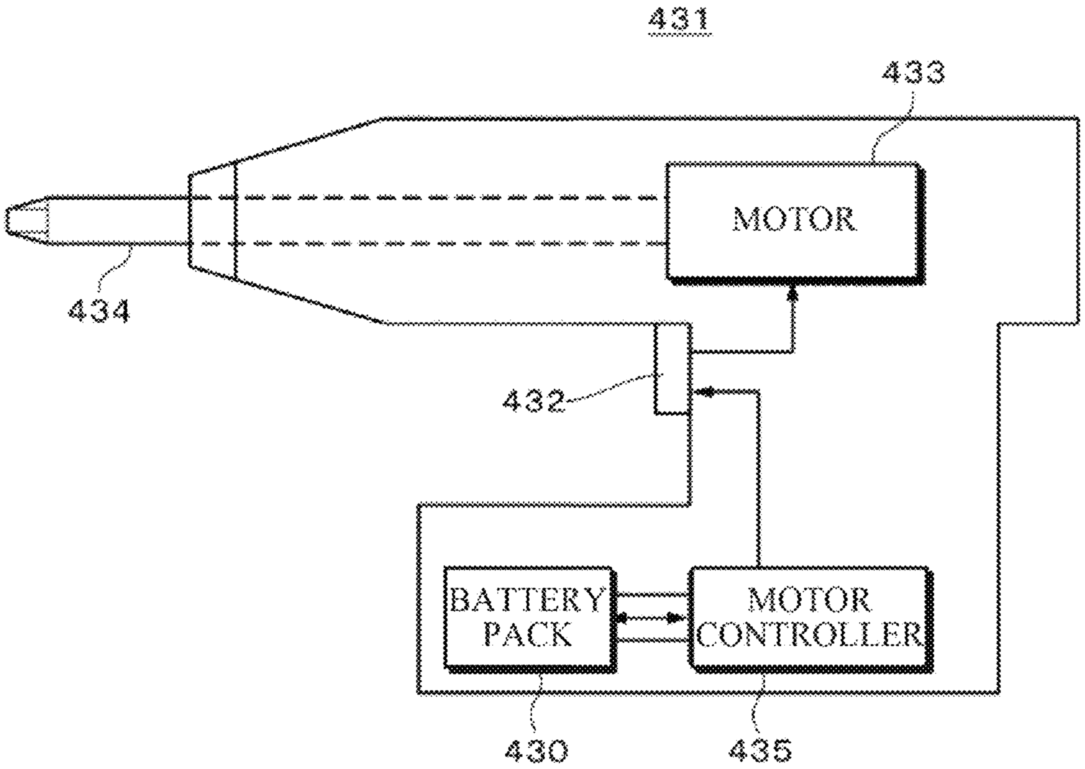
FIG. 19 is a coupling diagram for use to describe an electric tool as an application example according to an embodiment.

As an example of the electric tools to which the present technology is applicable, an electric screwdriver will be schematically described with reference to FIG. 19. An electric screwdriver 431 includes a motor 433 and a trigger switch 432. The motor 433 transmits rotational power to a shaft 434. The trigger switch 432 is operated by a user. A battery pack 430 and a motor controller 435 are contained in a lower housing of a handle of the electric screwdriver 431. The battery pack 430 is built in or detachably attached to the electric screwdriver 431. The secondary battery according to an embodiment is applicable to a battery included in the battery pack 430.

The battery pack 430 and the motor controller 435 may include respective microcomputers (not illustrated) communicable with each other to transmit and receive charge and discharge data on the battery pack 430. The motor controller 435 controls operation of the motor 433, and is able to cut off power supply to the motor 433 under abnormal conditions such as overdischarging.

Figure 20:
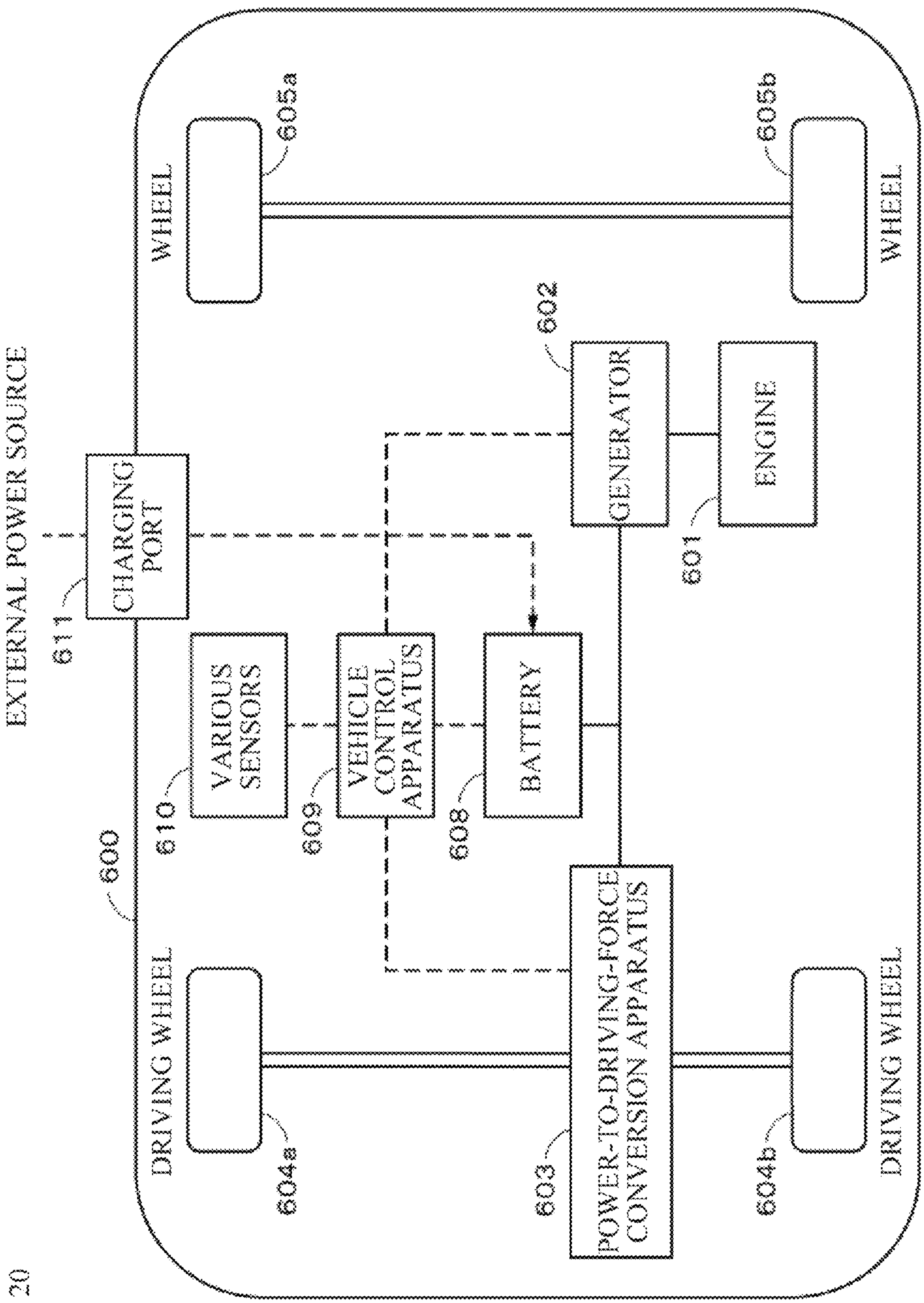
FIG. 20 is a coupling diagram for use to describe an electric vehicle as an application example according to an embodiment.

As an example of application to a power storage system for electric vehicles, FIG. 20 schematically illustrates a configuration example of a hybrid vehicle (HV) that employs a series hybrid system. The series hybrid system relates to a vehicle that travels with an electric-power-to-driving-force conversion apparatus, using electric power generated by a generator that uses an engine as a power source, or using electric power temporarily stored in a battery.

A hybrid vehicle 600 is equipped with an engine 601, a generator 602, an electric-power-to-driving-force conversion apparatus (a direct-current motor or an alternating-current motor; hereinafter, simply "motor 603"), a driving wheel 604*a*, a driving wheel 604*b*, a wheel 605*a*, a wheel 605*b*, a battery 608, a vehicle control apparatus 609, various sensors 610, and a charging port 611. The secondary battery according to an embodiment, or a power storage module equipped with a plurality of secondary batteries according to an embodiment is applicable to the battery 608.

The motor 603 operates under the electric power of the battery 608, and a rotational force of the motor 603 is transmitted to the driving wheels 604*a* and 604*b*. Electric power generated by the generator 602 using a rotational force generated by the engine 601 is storable in the battery 608. The various sensors 610 control an engine speed via the vehicle control apparatus 609, and control an opening angle of an unillustrated throttle valve.

When the hybrid vehicle 600 is decelerated by an unillustrated brake mechanism, a resistance force at the time of deceleration is applied to the motor 603 as a rotational force, and regenerative electric power generated from the rotational force is stored in the battery 608. In addition, the battery 608 is chargeable by being coupled to an external power source via the charging port 611 of the hybrid vehicle 600. Such an HV vehicle is referred to as a plug-in hybrid vehicle (PHV or PHEV).

Note that the secondary battery according to an embodiment may be applied to a small-sized primary battery and used as a power source of an air pressure sensor system (a tire pressure monitoring system: TPMS) built in the wheels 604 and 605.

Although the series hybrid vehicle has been described above as an example, the present technology is applicable also to a hybrid vehicle of a parallel system in which an engine and a motor are used in combination, or of a combination of the series system and the parallel system. Furthermore, the present technology is applicable to an electric vehicle (EV or BEV) and a fuel cell vehicle (FCV) that travel by means of only a driving motor without using an engine.

REFERENCE SIGNS LIST

1: lithium ion battery
12, 13: insulator
21: positive electrode
21A: positive electrode foil
21B: positive electrode active material layer
21C: positive electrode active material uncovered part
22: negative electrode
22A: negative electrode foil
22Ba: (first) negative electrode active material covered part
22Bb: (second) negative electrode active material covered part
22Ca, 22Cb: negative electrode active material uncovered part
23: separator
22Da: first insulating layer
22Db: second insulating layer
24: positive electrode current collector plate
25: negative electrode current collector plate
26: through hole
29Aa: (first) major surface
29Ab: (second) major surface
41, 42: end face
43: groove
221Aa: (first) negative electrode active material uncovered part
221Ab: (second) negative electrode active material uncovered part It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:

an electrode wound body including a positive electrode having a band shape and a negative electrode having a band shape, the positive electrode and the negative electrode being stacked with a separator interposed therebetween;

a positive electrode current collector plate;

a negative electrode current collector plate; and a battery can containing the electrode wound body, the positive electrode current collector plate, and the negative electrode current collector plate, wherein the electrode wound body has a positive electrode side end face facing the positive electrode current collector plate and a negative electrode side end face facing the negative electrode current collector plate, the positive electrode includes, on a positive electrode foil having a band shape, a positive electrode active material covered part covered with a positive electrode active material layer, and a positive electrode active material uncovered part, the positive electrode active material uncovered part is coupled to the positive electrode current collector plate at one of end parts of the electrode wound body, the negative electrode includes, at a first major surface of a negative electrode foil having a band shape, a first negative electrode active material covered part covered with a negative electrode active material layer, a first negative electrode active material uncovered part extending in a longitudinal direction of the negative electrode foil, and a first insulating layer provided between the first negative electrode active material covered part and the first negative electrode active material uncovered part, the negative electrode further includes, at a second major surface which is another major surface of the negative electrode foil, a second negative electrode active material covered part covered with a negative electrode active material layer, a second negative electrode active material uncovered part extending in the longitudinal direction of the negative electrode foil, and a second insulating layer provided between the second negative electrode active material covered part and the second negative electrode active material uncovered part, the negative electrode side end face of the electrode wound body has a flat surface in which a negative electrode active material uncovered part including the first negative electrode active material uncovered part and the second negative electrode active material uncovered part is bent toward a central axis of the electrode wound body and overlaps, and the negative electrode side end face has a groove, the negative electrode current collector plate is coupled to the flat surface, and when at least the negative electrode side of the electrode wound body is viewed in a section taken along a plane including the central axis, the first major surface faces toward the central axis of the electrode wound body, and furthermore, a length of the first insulating layer is smaller than a length of the second insulating layer.

2. The secondary battery according to claim 1, wherein a ratio of the length of the first insulating layer to the length of the second insulating layer is higher than or equal to 52 percent and lower than or equal to 92 percent.

3. The secondary battery according to claim 1, wherein a difference between the length of the first insulating layer and the length of the second insulating layer is greater than or equal to 0.1 millimeters and less than or equal to 1.0 millimeters.

4. The secondary battery according to claim 3, wherein the first insulating layer and the second insulating layer each include polyvinylidene difluoride.

5. The secondary battery according to claim 1, wherein the first insulating layer and the second insulating layer each include: a metal having an X-ray shielding effect higher than an X-ray shielding effect of a metal included in the negative electrode foil; or a metal compound including a metal having an X-ray shielding effect higher than the X-ray shielding effect of the metal included in the negative electrode foil.

6. Electronic equipment comprising the secondary battery according to claim 1.

7. An electric tool comprising the secondary battery according to claim 1.

* * * * *